//cid: US008896927B2

United States Patent
Saito et al.

(10) Patent No.: US 8,896,927 B2
(45) Date of Patent: Nov. 25, 2014

(54) REAL-IMAGE VARIABLE-MAGNIFICATION VIEWFINDER AND IMAGING APPARATUS

(71) Applicant: FUJIFILM Corporation, Tokyo (JP)

(72) Inventors: Hiroki Saito, Saitama-ken (JP); Michio Cho, Saitama-ken (JP)

(73) Assignee: FUJIFILM Corporation, Tokyo (JP)

(*) Notice: Subject to any disclaimer, the term of this patent is extended or adjusted under 35 U.S.C. 154(b) by 0 days.

(21) Appl. No.: 14/162,242

(22) Filed: Jan. 23, 2014

(65) Prior Publication Data

US 2014/0139913 A1     May 22, 2014

Related U.S. Application Data

(63) Continuation of application No. PCT/JP2012/004944, filed on Aug. 3, 2012.

(30) Foreign Application Priority Data

Aug. 15, 2011    (JP) ................. 2011-177380

(51) Int. Cl.
| | |
|---|---|
| G02B 9/34 | (2006.01) |
| G02B 15/14 | (2006.01) |
| G03B 13/02 | (2006.01) |
| G03B 13/06 | (2006.01) |
| G03B 13/10 | (2006.01) |

(52) U.S. Cl.
CPC .............. *G03B 13/02* (2013.01); *G03B 23/145* (2013.01); *G03B 13/06* (2013.01); *G03B 13/10* (2013.01)
USPC ............................ 359/644; 359/687; 359/774

(58) Field of Classification Search
USPC .................. 359/643–644, 687, 771, 774, 432
See application file for complete search history.

(56) References Cited

U.S. PATENT DOCUMENTS

| | | | | |
|---|---|---|---|---|
| 5,513,043 | A | * 4/1996 | Abe et al. | ...... 359/691 |
| 5,694,244 | A | 12/1997 | Abe et al. | |
| 5,748,381 | A | * 5/1998 | Ono | ...... 359/647 |
| 6,377,405 | B2 | * 4/2002 | Kasai | ...... 359/686 |
| 7,206,129 | B2 | * 4/2007 | Hosoya | ...... 359/431 |

FOREIGN PATENT DOCUMENTS

| | | |
|---|---|---|
| JP | 08-43885 | 2/1996 |
| JP | 08-122856 | 5/1996 |
| JP | 09-105863 | 4/1997 |
| JP | 10-10440 | 1/1998 |
| JP | 2009-002991 | 1/2009 |
| JP | 2010-039339 | 2/2010 |

OTHER PUBLICATIONS

International Search Report, PCT/JP2012/004944, Dec. 11, 2012.

* cited by examiner

*Primary Examiner* — Jordan Schwartz
(74) *Attorney, Agent, or Firm* — Young & Thompson

(57) ABSTRACT

A real-image variable-magnification viewfinder substantially consists of, in order from the object side: an objective lens system substantially consisting of a positive first lens, a negative second lens, a positive third lens, and a positive fourth lens; an erect optical system formed by a plurality of optical members; and a positive eyepiece lens system. The first lens and the third lens are fixed relative to the optical axis direction during magnification change, and the second lens and the fourth lens are moved in the optical axis direction during magnification change. All optical surfaces of all the optical members forming the erect optical system are planar surfaces. At least one of the optical members forming the erect optical system is made of a glass material. A predetermined conditional expression is satisfied.

8 Claims, 18 Drawing Sheets

FIG.11　EXAMPLE 2

FIG.16 EXAMPLE 7

REAL-IMAGE VARIABLE-MAGNIFICATION VIEWFINDER AND IMAGING APPARATUS

CROSS REFERENCE TO RELATED APPLICATIONS

This application is a continuation of PCT/JP2012/004944 filed on Aug. 3, 2012, which claims foreign priority to Japanese Application No. 2011-177380 filed on Aug. 15, 2011. The entire contents of each of the above applications are hereby incorporated by reference.

TECHNICAL FIELD

The present invention relates to a real-image variable-magnification viewfinder and an imaging apparatus, and particularly to a real-image variable-magnification viewfinder that is suitably usable with a digital camera or a film camera, and an imaging apparatus provided with the real-image variable-magnification viewfinder.

BACKGROUND ART

Conventionally, a so-called real-image viewfinder, where an image formed by an objective optical system is inverted into an erect image by an erect optical system, and the erect image is observed via an eyepiece optical system, is used as a viewfinder. Further, with a digital camera including an imaging optical system and a viewfinder which are separately formed where the imaging optical system has a magnification changing function, a viewfinders having a magnification changing function is often used so as to be able to accommodate an imaging angle of view and a zoom ratio of the imaging optical system. In recent years, high-quality digital cameras provided with a this type of real-image variable-magnification viewfinder are being introduced into the market. As a real-image variable-magnification viewfinder having a relatively high zoom ratio, those disclosed in Japanese Unexamined Patent Publication Nos. 8(1996)-122856, 2009-002991 and 2010-039339 (hereinafter, Patent Documents 1, 2 and 3, respectively), for example, are known.

DISCLOSURE OF INVENTION

The real-image variable-magnification viewfinder disclosed in Patent Document 1, however, only has a zoom ratio of around 3:1, which is rather insufficient to meet the recent demands. The real-image variable-magnification viewfinder disclosed in Patent Document 2 can only accommodate a narrow angle of view and is therefore not suitable for use with a camera equipped with a wide-angle lens. The real-image variable-magnification viewfinder disclosed in Patent Document 3 has both a sufficient angle of view and a sufficient zoom ratio. However, the real-image variable-magnification viewfinder disclosed in Patent Document 3 has a low magnification power relative to the angle of view, and the apparent angle of view thereof is insufficient. Therefore, it cannot sufficiently satisfy the user in view of ease of viewing.

In addition, due to increasing price competition and size reduction of cameras of recent years, there are strong demands for cost reduction and size reduction of viewfinders.

In view of the above-described circumstances, the present invention is directed to providing a real-image variable-magnification viewfinder that has a compact and inexpensive configuration while providing a wide angle of view and a high zoom ratio and allowing observation of a good viewfinder image, and a camera provided with the real-image variable-magnification viewfinder.

The real-image variable-magnification viewfinder of the invention is a real-image variable-magnification viewfinder substantially consisting of: an objective lens system; an erect optical system formed by a plurality of optical members; and an eyepiece lens system having a positive refractive power, wherein the objective lens system substantially consisting of four lenses including, in order from the object side, a first lens having a positive refractive power, a second lens having a negative refractive power, a third lens having a positive refractive power, a fourth lens having a positive refractive power, the first lens and the third lens are fixed relative to an optical axis direction during magnification change, and the second lens and the fourth lens are moved in the optical axis direction during magnification change, all optical surfaces of all the optical members forming the erect optical system are planar surfaces, and at least one of the optical members forming the erect optical system is made of a glass material and satisfies conditional expression (1) below:

$$1.6 < Nd \qquad (1),$$

where Nd is a refractive index with respect to the d-line of the glass material.

It should be noted that the descriptions "substantially consisting of" and "substantially consists of four lenses" means that lenses substantially without any power, optical elements other than lenses, such as a field frame, a stop and a glass cover, and mechanical components, such as a lens flange, a lens barrel, an image sensor, and a camera shake correcting mechanism, etc., may be included.

It should be noted that, as to the description "positive" or "negative" with respect to the refractive power of each lens, if the lens is an aspherical lens, the description is about a refractive power of the lens in the paraxial region.

It is more preferable that conditional expression (1A) below is satisfied in place of the conditional expression (1), and it is even more preferable that conditional expression (1B) below is satisfied in place of the conditional expression (1):

$$1.7 < Nd \qquad (1A)$$

or $$1.8 < Nd \qquad (1B).$$

In the real-image variable-magnification viewfinder of the invention, it is preferable that conditional expression (2) below is satisfied:

$$0.18 < |\gamma \cdot \tan \omega| < 0.40 \qquad (2),$$

where $\gamma$ is an angular magnification of the entire system in a lowest magnification state and $\omega$ is a maximum half angle of view in the lowest magnification state.

It is more preferable that conditional expression (2A) below is satisfied in place of the conditional expression (2):

$$0.23 < |\gamma \cdot \tan \omega| < 0.35 \qquad (2A).$$

In the real-image variable-magnification viewfinder of the invention, it is preferable that at least one of the optical members forming the erect optical system is made of a glass material and satisfies conditional expression (3) below:

$$\nu d < 30 \qquad (3),$$

where $\nu d$ is an Abbe number with respect to the d-line of the glass material.

In the real-image variable-magnification viewfinder of the invention, it is preferable that, when the magnification is changed from a low magnification side to a high magnification side, the second lens is moved toward an eyepiece lens system and the fourth lens is moved toward the object side.

In the real-image variable-magnification viewfinder of the invention, it is preferable that conditional expression (4) below is satisfied:

$$-1<(R1f+R1r)/(R1f-R1r)<1 \quad (4),$$

where R1f is a radius of curvature of an object-side surface of the first lens, and R1r is a radius of curvature of an eye point-side surface of the first lens.

It is more preferable that conditional expression (4A) below is satisfied in place of the conditional expression (4):

$$-0.80<(R1f+R1r)/(R1f-R1r)<0.10 \quad (4A).$$

It should be noted that the sign (positive or negative) with respect to the radius of curvature means that a surface shape that is convex toward the object side is positive and a surface shape that is convex toward the eye point side is negative.

The imaging apparatus of the invention is provided with the above-described real-image variable-magnification viewfinder of the invention.

According to the real-image variable-magnification viewfinder of the invention, magnification change is achieved by moving only the second lens and the fourth lens of the objective lens system, which substantially consists of four lenses including, in order from the object side, a positive lens, a negative lens, a positive lens and a positive lens. This allows providing a high zoom ratio while achieving a compact and low-cost configuration. Further, according to the real-image variable-magnification viewfinder of the invention, the configuration of the erect optical system, in particular, the surface shape and the material of the erect optical system are suitably set. This allows providing a wide angle of view and a high zoom ratio, increasing the magnification power and the apparent angle of view relative to the angle of view, minimizing degradation of performance due to errors during manufacture, and observing a good viewfinder image while achieving an inexpensive and compact configuration.

According to the imaging apparatus of the invention provided with the real-image variable-magnification viewfinder of the invention, an inexpensive and compact configuration can be achieved, a wide angle of view and a high zoom ratio can be provided, and a good viewfinder image can be observed.

DESCRIPTION OF PREFERRED EMBODIMENTS

Figure 1:
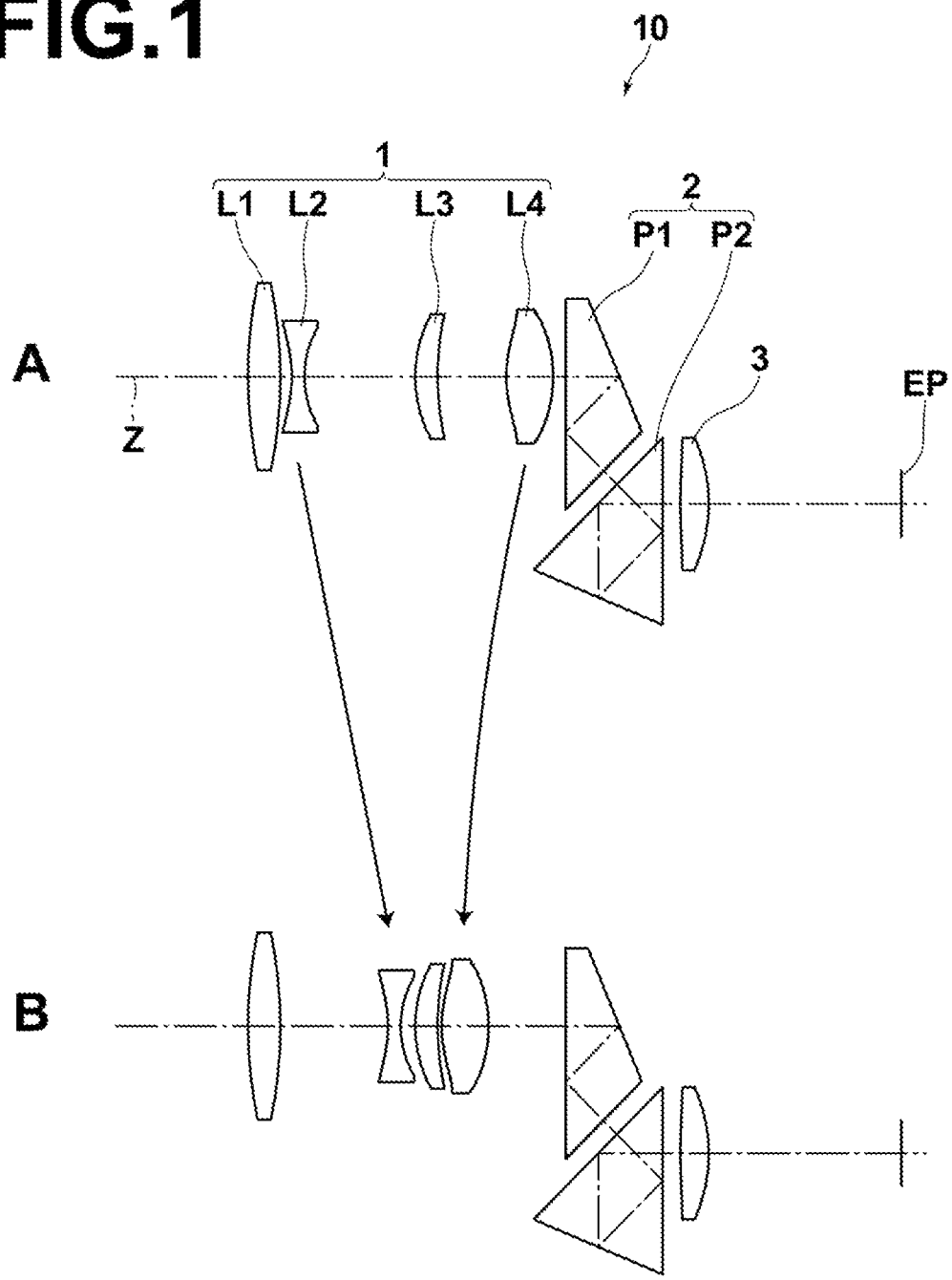
FIG. 1 shows, at A to B, sectional views illustrating the configuration of a real-image variable-magnification viewfinder of one embodiment of the invention.

Hereinafter, an embodiment of the present invention will be described in detail with reference to the drawings. FIG. 1 shows, at A and B, sectional views of a real-image variable-magnification viewfinder 10 according to one embodiment of the invention. The sectional views shown at A and B in FIG. 1 illustrate the real-image variable-magnification viewfinder 10 in a lowest magnification state and in a highest magnification state, respectively. In FIG. 1, the left side of the drawing is an object side and the right side of the drawing is an eye point EP. The components shown at B in FIG. 1 are the same as those shown at A in FIG. 1, and the difference therebetween is only positions of some of the components. Therefore, the reference symbols are omitted at B in FIG. 1.

The real-image variable-magnification viewfinder 10 of this embodiment substantially consists of, in order from the object side toward the eye point side along the optical axis Z: an objective lens system 1; an erect optical system 2 to invert an inverted image formed by the objective lens system 1 into an erect image; and an eyepiece lens system 3 having a positive refractive power used to observe the erect image.

The objective lens system 1 substantially consists of four lenses including, in order from the object side toward the eye point side, a first lens L1 having a positive refractive power, a second lens L2 having a negative refractive power, a third lens L3 having a positive refractive power, and a fourth lens L4 having a positive refractive power.

The first lens L1 and the third lens L3 are fixed relative to the optical axis direction during magnification change, and the second lens L2 and the fourth lens L4 are moved in the optical axis direction to achieve magnification change. The configuration where only two lenses, i.e., the second lens L2 and the fourth lens L4, are moved during magnification change allows simplifying the mechanical structure when compared to a configuration where the first lens L1 or the third lens L3, besides the two lenses, is also moved during magnification change, thereby providing a high zoom ratio without complicating the device configuration.

Trajectories of the second lens L2 and the fourth lens L4 that are moved during magnification change are schematically shown by the arrows between A and B in FIG. 1. As shown by the arrows in the drawing, it is preferable that, when the magnification is changed from the low magnification side to the high magnification side, the second lens L2 is moved toward the eyepiece lens system and the fourth lens L4 is moved toward the object side. In this case, a high zoom ratio can be achieved without excessively increasing the refractive powers of the second lens L2 and the fourth lens L4.

It should be noted that, in the objective lens system 1 of the example shown at A in FIG. 1, the first lens L1 is formed by a biconvex lens, the second lens L2 is formed by a biconcave lens, the third lens L3 is formed by a positive meniscus lens with the convex surface facing the object side, and the fourth lens L4 is formed by a biconvex lens, all of which are single lenses. However, the shapes of the individual lenses of the objective lens system of the invention are not necessarily limited to those described above.

The eyepiece lens system 3 of the example shown at A in FIG. 1 is formed by a biconvex lens, which is a single lens. However, the shape the lens forming the eyepiece lens system of the invention is not necessarily limited to one described above. Alternatively, the eyepiece lens system of the invention may be formed by a plurality of lenses.

The erect optical system 2 is formed by a plurality of optical members. The erect optical system 2 of the example shown at A in FIG. 1 is formed by two prisms including, in order from the object side, a triangular prism P1 and a roof prism P2, which are arranged with a predetermined air space therebetween such that the focal position of the objective lens system 1 is located between the triangular prism P1 and the roof prism P2. However, the optical members forming the erect optical system 2 are not necessarily limited to the triangular prism and the roof prism, and a prism other than these types of prisms, a mirror, or other type of optical member may be used to form the erect optical system 2.

Forming the erect optical system by a plurality of optical members allows providing a predetermined air space between two of the optical members so as to position a field frame in this air space. Usually, the field frame is positioned at or in the vicinity of the focal position of the objective lens system. However, in a case where the erect optical system is formed by one optical member, the focal position of the objective lens system is located inside the optical member, and it is impossible to dispose the field frame, or the size of the objective lens system is increased to dispose the field frame outside the optical member. In the case where the erect optical system 2 is formed by two members, as in the example shown at A in FIG. 1, the field frame can be positioned as described above while minimizing the number of parts to achieve cost reduction.

Further, in this embodiment, all optical surfaces of all the optical members of the erect optical system 2 are planar surfaces, and at least one of the optical members of the erect optical system 2 is made of a glass material and satisfies conditional expression (1) below:

$$1.6 < Nd \tag{1},$$

where Nd is a refractive index with respect to the d-line of the glass material.

For example, the erect optical system 2 of the example shown at A in FIG. 1 has two entrance surfaces, two exit surfaces and six reflective surfaces, all of which are optical surfaces. Making all the optical surfaces of the optical members of the erect optical system 2 planar surfaces is advantageous in view of costs when compared to a case where the optical surfaces are curved surfaces. Further, while it is preferable to use glass as the material forming the erect optical system 2 due to the reasons described below, there are problems of difficulty of manufacture and cost increase if the erect optical system 2 is formed using a glass material and includes curved optical surfaces. These problems can be avoided when all the optical surfaces are planar surfaces, thereby facilitating forming the erect optical system 2 using glass.

The erect optical system 2 is often formed by prisms having a refractive index higher than that of air to increase the optical path length to achieve size reduction. However, when it is attempted to increase the apparent angle of view, the volume of the erect optical system is inevitably increased. Conventional real-image viewfinders often use prisms made of a plastic material to form the erect optical system. However, plastic prisms have a problem that, when the volume of the prism is increased, surface accuracy is significantly degraded due to influence of shrink at the time of molding. Further, in the case where the erect optical system includes a roof surface, if a plastic material is used, squareness of the roof surface is degraded due to influence of shrink at the time of molding, causing significantly degraded image quality. In order to prevent these problems, it is desirable to use glass to make the prisms forming the erect optical system. That is, making the optical surfaces planar surfaces and using a glass material allow minimizing degradation of performance due to errors during manufacture and providing a good viewfinder image while achieving the cost reduction.

Further, a glass material having a high refractive index can be selected when the optical member made of the glass material of the erect optical system 2 satisfies the conditional expression (1), thereby achieving the size reduction while ensuring a high magnification power and a large apparent angle of view relative to the angle of view. If the lower limit of the conditional expression (1) is not reached, the erect optical system 2 becomes large when a large apparent angle of view is provided.

In view of the above-described circumstances, it is more preferable that conditional expression (1A) below is satisfied in place of the conditional expression (1), and it is even more preferable that conditional expression (1B) below is satisfied in place of the conditional expression (1):

$$1.7 < Nd \tag{1A}$$

or $$1.8 < Nd \tag{1B}.$$

When the conditional expression (1A) or (1B) is satisfied, the obtained effect is higher than that obtained when the conditional expression (1) is satisfied.

Further, it is preferable that the real-image variable-magnification viewfinder 10 of this embodiment selectively has at least one of or any combination of the configurations described below, as appropriate.

It is preferable that the real-image variable-magnification viewfinder 10 of this embodiment satisfies conditional expression (2) below:

$$0.18 < |\gamma \cdot \tan \omega| < 0.40 \quad (2),$$

where γ is an angular magnification of the entire system in the lowest magnification state and ω is a maximum half angle of view in the lowest magnification state.

If the lower limit of the conditional expression (2) is not reached, a sufficient apparent angle of view cannot be obtained. If the upper limit of the conditional expression (2) is exceeded, the optical member disposed on the eye point side of the focal position of the objective lens system 1, among the optical members forming the erect optical system 2, becomes large, leading to size increase of a device on which the real-image variable-magnification viewfinder 10 is mounted. When the conditional expression (2) is satisfied, a sufficient apparent angle of view can be ensured while minimizing the size increase.

It is more preferable that conditional expression (2A) is satisfied in place of the conditional expression (2):

$$0.23 < |\gamma \cdot \tan \omega| < 0.35 \quad (2A).$$

When the conditional expression (2A) is satisfied, the obtained effect is higher than that obtained when the conditional expression (2) is satisfied.

It is preferable that at least one of the optical members forming the erect optical system 2 of the real-image variable-magnification viewfinder 10 of this embodiment is made of a glass material and satisfies conditional expression (3) below:

$$\nu d < 30 \quad (3),$$

where νd is an Abbe number with respect to the d-line of the glass material.

In the case where the conditional expression (3) is satisfied, more successful correction of longitudinal chromatic aberration can be achieved, thereby minimizing color blur that occurs when the user looking into the viewfinder moves the eye.

It is preferable that the real-image variable-magnification viewfinder 10 of this embodiment satisfies conditional expression (4) below:

$$-1 < (R1f + R1r)/(R1f - R1r) < 1 \quad (4),$$

where R1f is a radius of curvature of the object-side surface of the first lens L1, and R1r is a radius of curvature of the eye point-side surface of the first lens L1.

If the lower limit of the conditional expression (4) is not reached, distortion is increased at the low magnification side. If the upper limit of the conditional expression (4) is exceeded, astigmatism in the peripheral area of the image is increased at the low magnification side. When the conditional expression (4) is satisfied, the distortion at the low magnification side and the astigmatism in the peripheral area of the image are minimized.

It is more preferable that conditional expression (4A) is satisfied in place of the conditional expression (4):

$$-0.80 < (R1f + R1r)/(R1f - R1r) < 0.10 \quad (4A).$$

When the conditional expression (4A) is satisfied, the obtained effect is higher than that obtained when the conditional expression (4) is satisfied.

Figure 18:
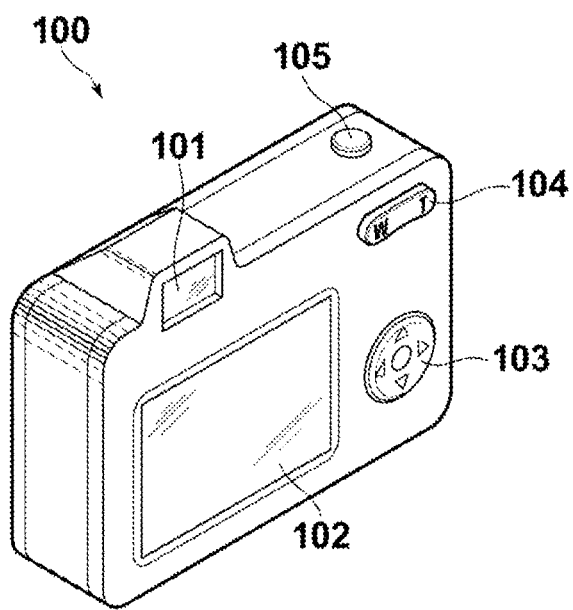
FIG. 18 is a rear perspective view of an imaging apparatus according to an embodiment of the invention.

Next, an embodiment of the imaging apparatus of the invention is described. FIG. 18 is a rear side perspective view of a digital camera 100 according to one embodiment of the imaging apparatus of the invention. The digital camera 100 includes, at the upper portion of the camera body, a real-image variable-magnification viewfinder 101 according to the embodiment of the invention. The digital camera 100 also includes, at the rear side of the camera body, a monitor 102 for displaying images and various setting screens, an operation button 103 for making various settings, and a zoom lever 104 for changing the magnification. The digital camera 100 also includes a shutter button 105 at the upper side of the camera body.

In the digital camera 100, a subject image taken through an imaging lens (not shown) disposed at the front side of the camera body is formed on the imaging plane of an image sensor (not shown). The user look into the real-image variable-magnification viewfinder 101 from the rear side thereof to observe a viewfinder image of the subject. When the zoom lever 104 is operated during an imaging operation, the magnification of the imaging lens is changed, and the magnification of the real-image variable-magnification viewfinder 101 is changed at the same time.

Next, numerical examples of the real-image variable-magnification viewfinder of the invention are described. FIGS. 2 to 9 are sectional views illustrating the configurations of real-image variable-magnification viewfinders of Examples 1 to 8, respectively. Tables 1 and 2, which will be presented later, show basic lens data and aspherical surface data of the real-image variable-magnification viewfinder of Example 1, respectively. Similarly, Tables 3 to 16, which will be presented later, show basic lens data and aspherical surface data of the real-image variable-magnification viewfinders of Examples 2 to 8, respectively. It should be noted that, in the following description of the examples, the real-image variable-magnification viewfinder of Example 1 is explained as an example. The manner of diagramatic representation and symbol and signs used are basically the same in the description of Example 1 and Examples 2 to 8.

Figure 2:
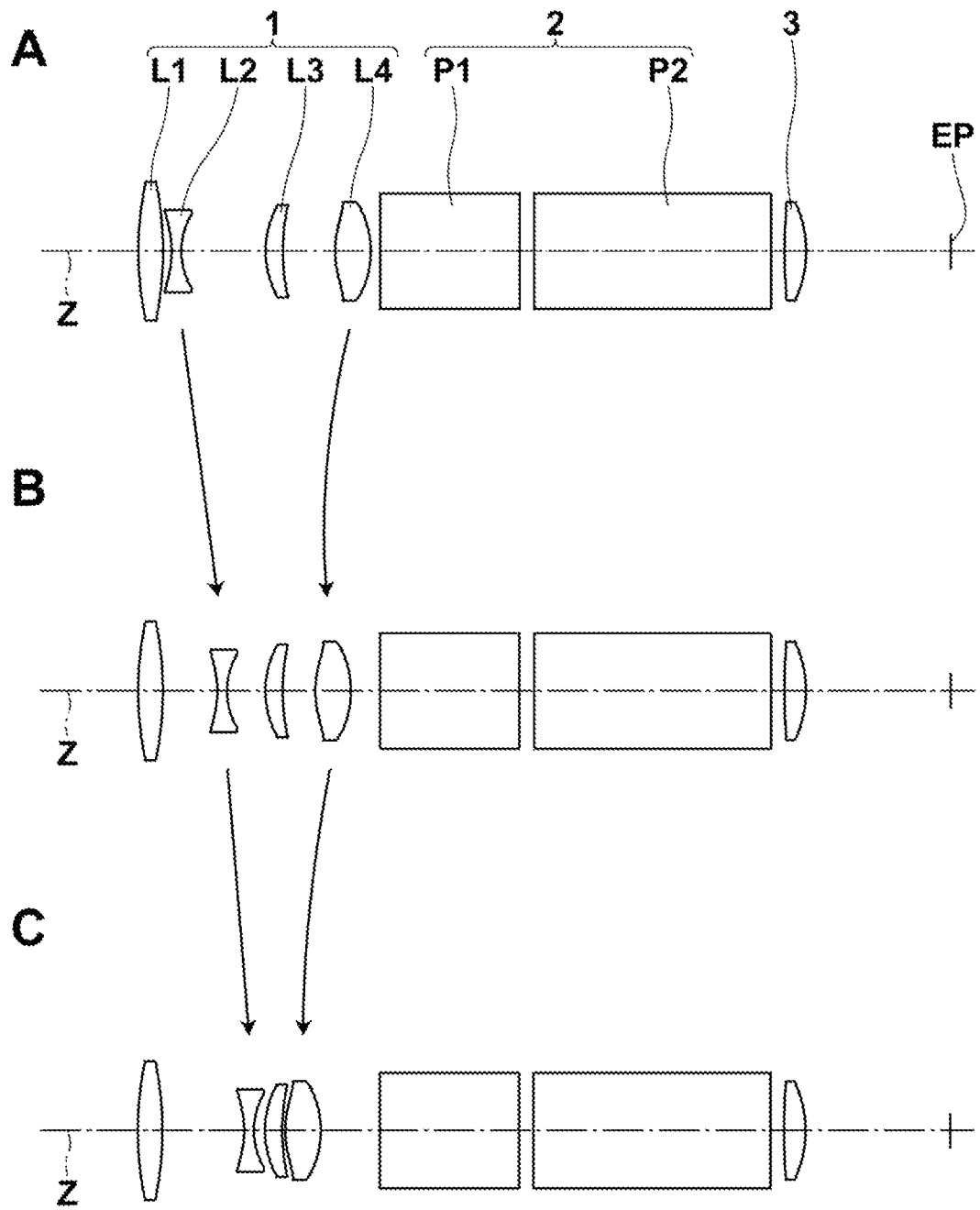
FIG. 2 shows, at A to C, sectional views illustrating the configuration of a real-image variable-magnification viewfinder of Example 1 of the invention.
Figure 3:
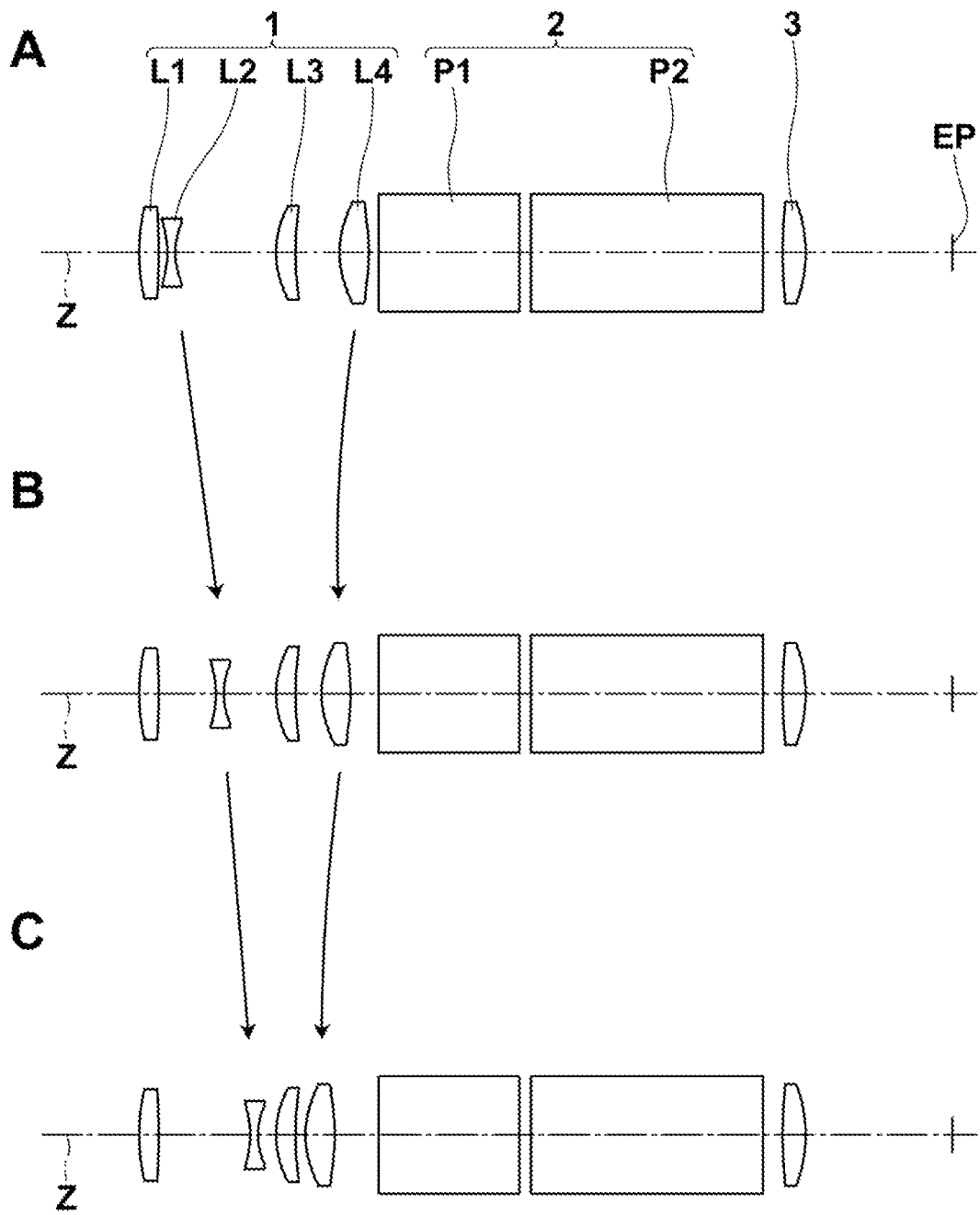
FIG. 3 shows, at A to C, sectional views illustrating the configuration of a real-image variable-magnification viewfinder of Example 2 of the invention.
Figure 4:
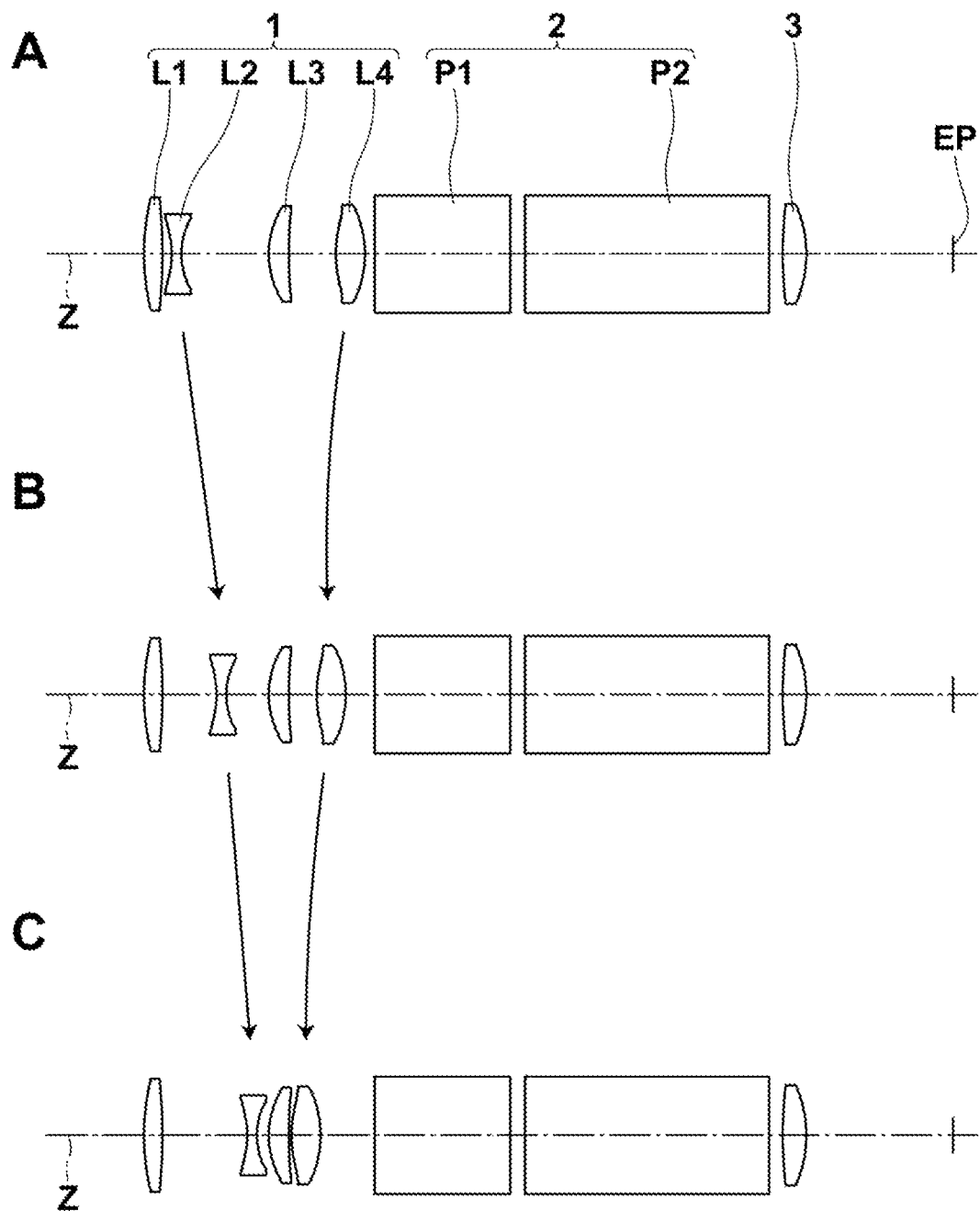
FIG. 4 shows, at A to C, sectional views illustrating the configuration of a real-image variable-magnification viewfinder of Example 3 of the invention.
Figure 5:
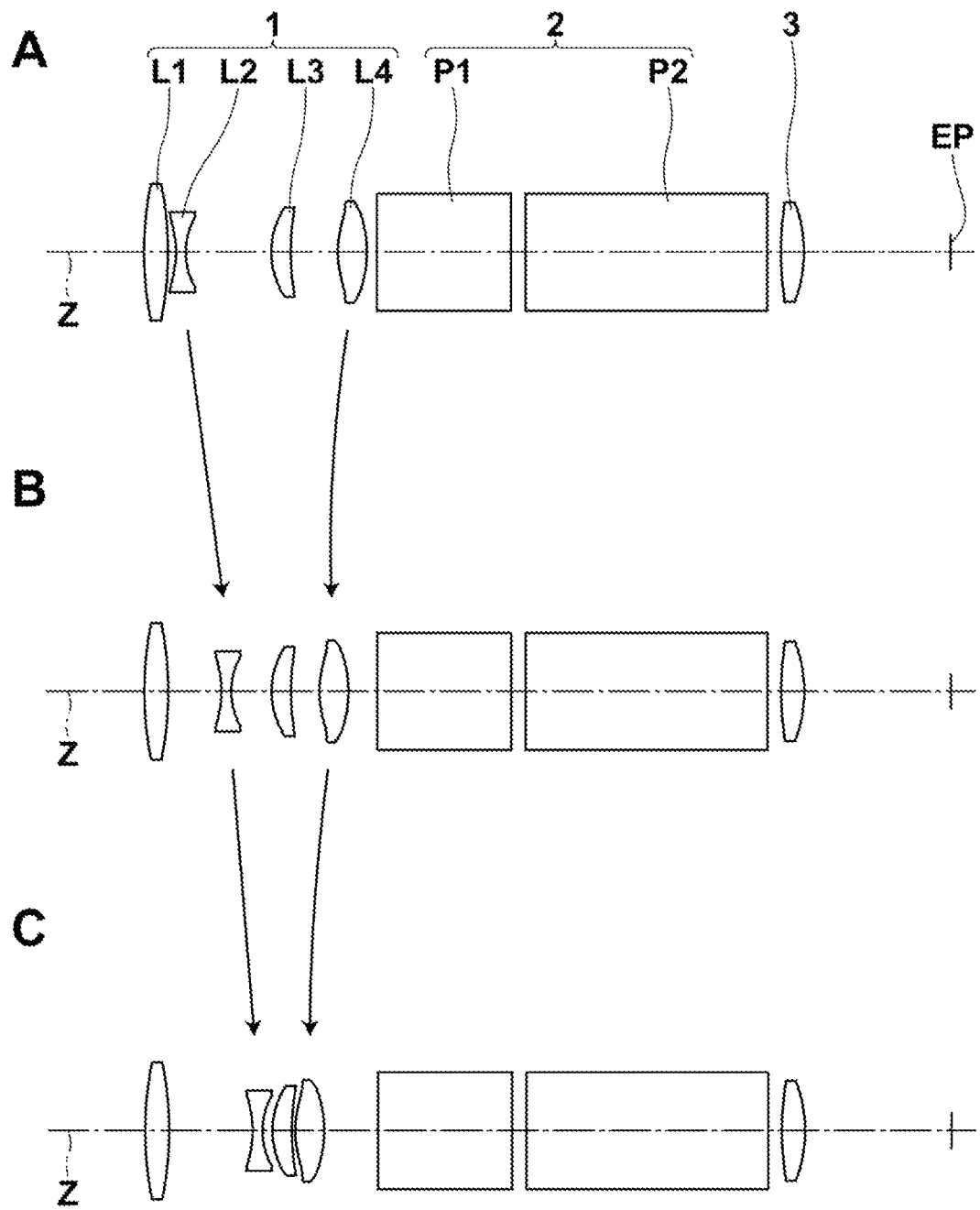
FIG. 5 shows, at A to C, sectional views illustrating the configuration of a real-image variable-magnification viewfinder of Example 4 of the invention.
Figure 6:
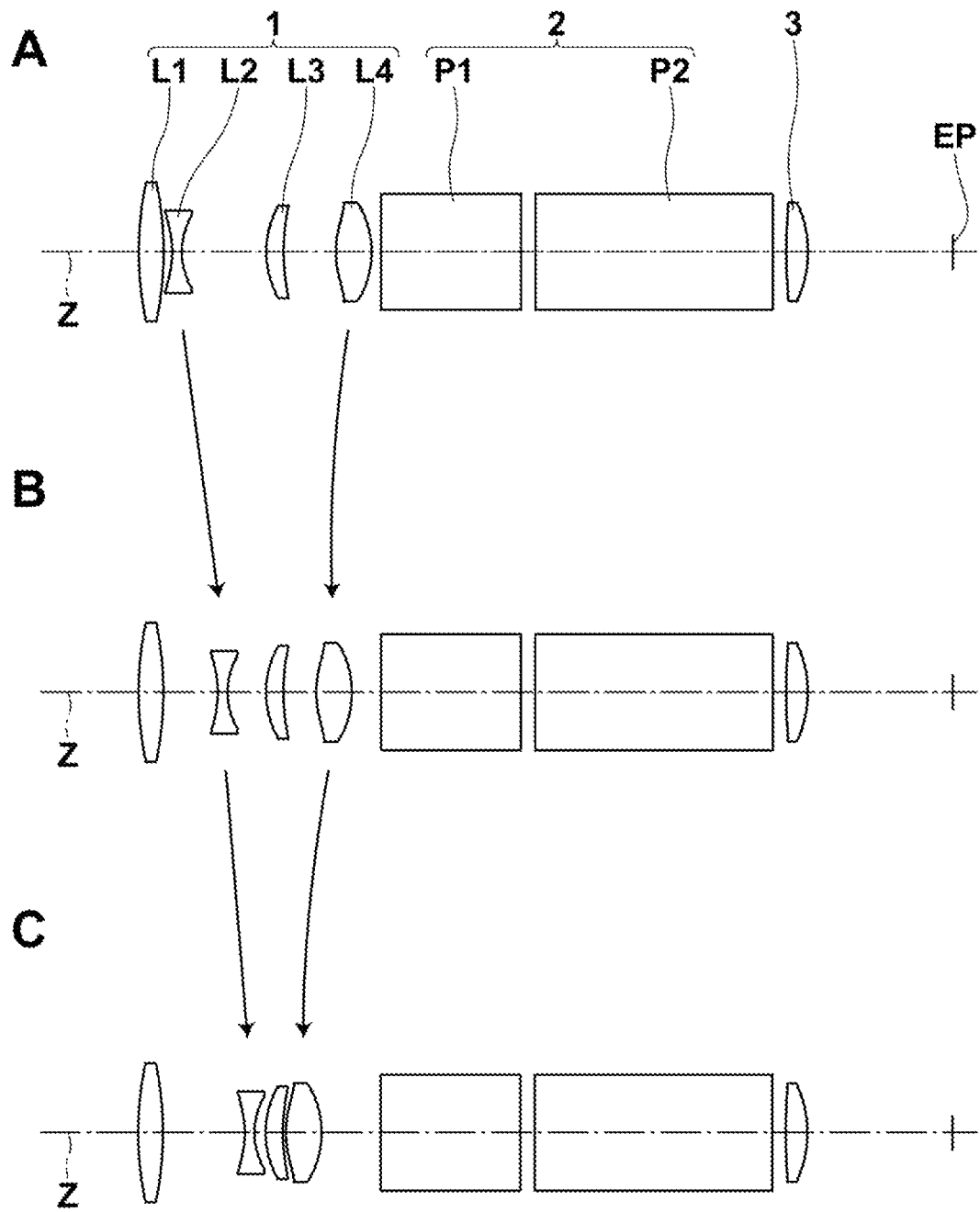
FIG. 6 shows, at A to C, sectional views illustrating the configuration of a real-image variable-magnification viewfinder of Example 5 of the invention.
Figure 7:
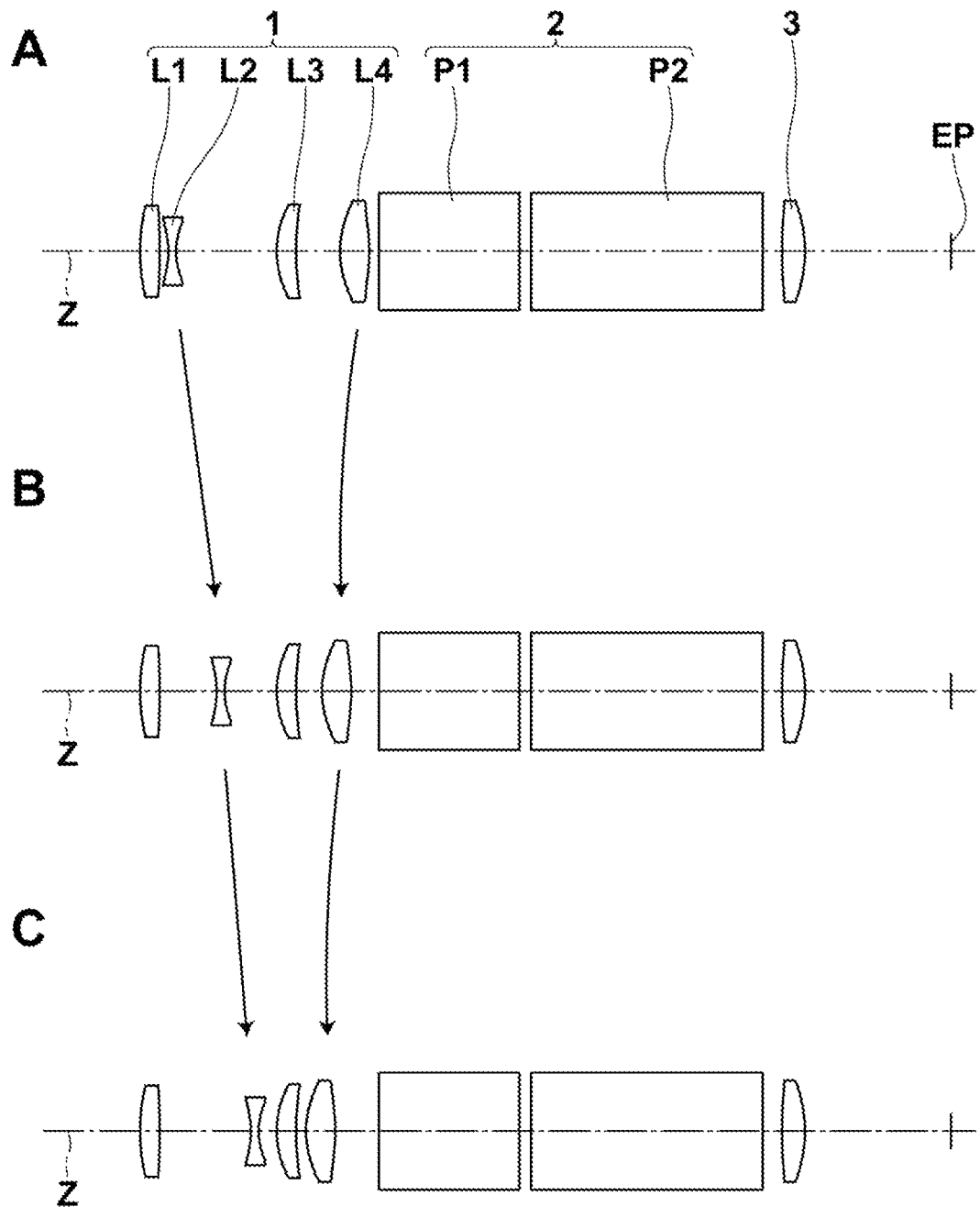
FIG. 7 shows, at A to C, sectional views illustrating the configuration of a real-image variable-magnification viewfinder of Example 6 of the invention.
Figure 8:
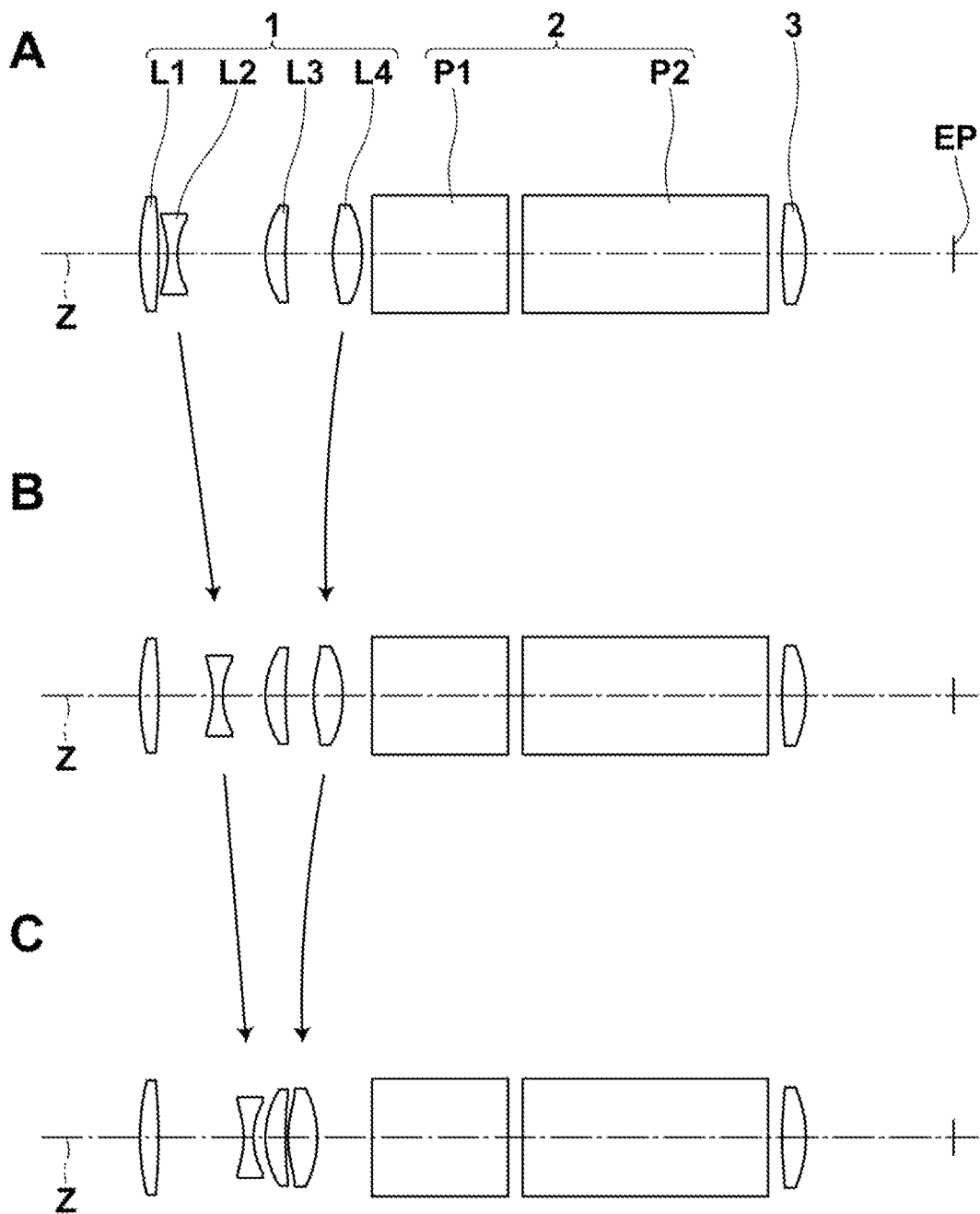
FIG. 8 shows, at A to C, sectional views illustrating the configuration of a real-image variable-magnification viewfinder of Example 7 of the invention.
Figure 9:
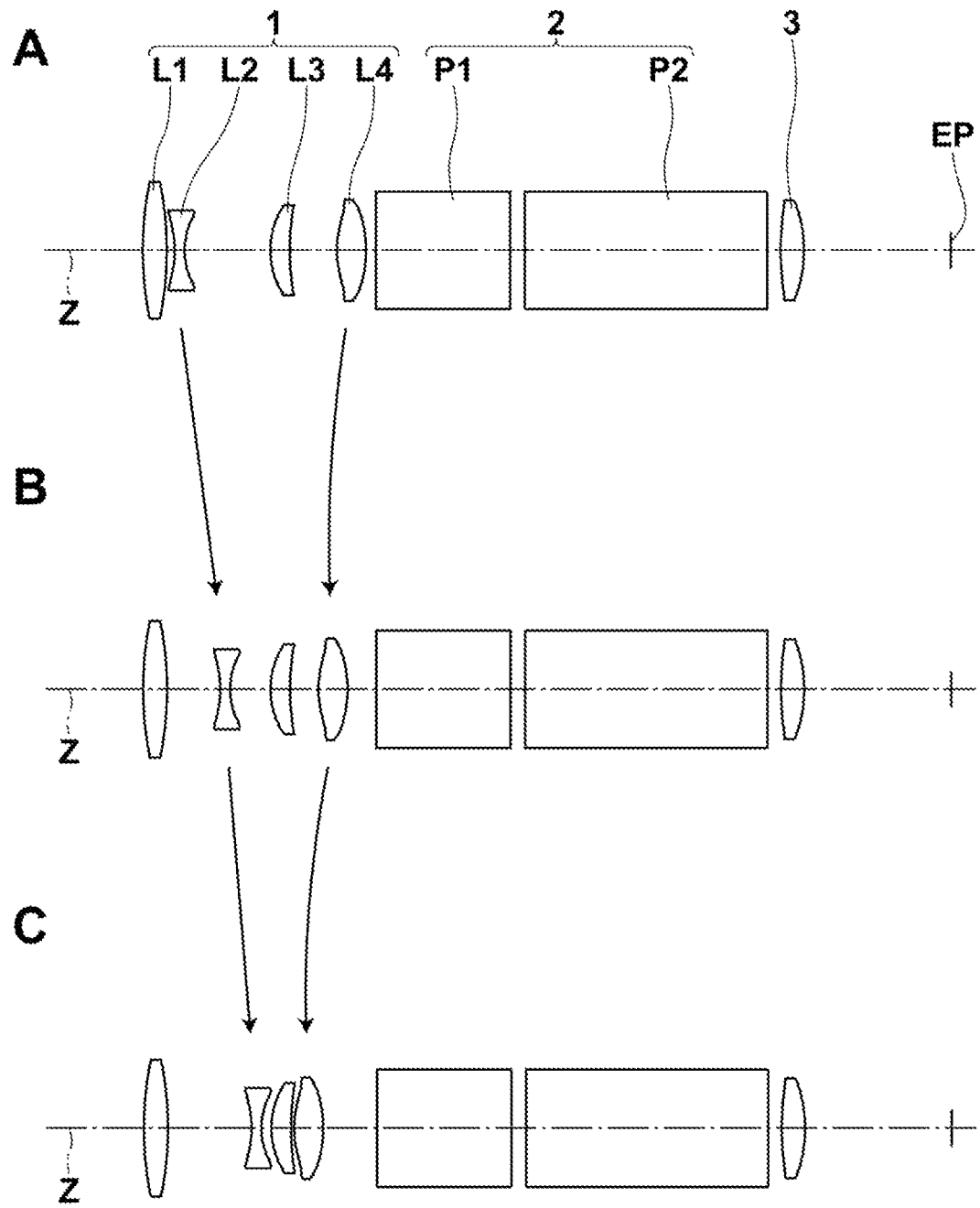
FIG. 9 shows, at A to C, sectional views illustrating the configuration of a real-image variable-magnification viewfinder of Example 8 of the invention.

FIG. 2 shows, at A, B and C, sectional views of the real-image variable-magnification viewfinder of Example 1 in a lowest magnification state, in an intermediate magnification state and in a highest magnification state, respectively. In the sectional view of each example, the left side in the drawing is the object side, and the triangular prism P1 and the roof prism P2 are developed along the optical path. The components shown at B and C in FIG. 2 are the same as those shown at A in FIG. 2, and the difference therebetween is only positions of some of the components. Therefore, some of the reference symbols are omitted at B and C in FIG. 2.

The real-image variable-magnification viewfinder of Example 1 includes, in order from the object side, the objective lens system 1, the erect optical system 2 and the eyepiece lens system 3. The objective lens system 1 includes, in order from the object side, a first lens L1 having a biconvex shape, a second lens L2 having a biconcave shape in the paraxial region, a third lens L3 having a positive meniscus shape with the convex surface facing the object side, and a fourth lens L4 having a biconvex shape in the paraxial region. The first to fourth lenses L1 to L4 are single lenses which are not cemented. The object-side surface of the second lens L2 and the both sides of the fourth lens L4 are aspherical surfaces.

The first lens L1 and the third lens L3 are fixed relative to the optical axis direction during magnification change, and the second lens L2 and the fourth lens L4 are moved in the optical axis direction to achieve magnification change. Trajectories of the second lens L2 and the fourth lens L4 that are moved during magnification change are schematically shown by the arrows between A, B and C in FIG. 2. When the magnification is changed from the low magnification side to a higher magnification, the second lens L2 is moved toward the eyepiece lens side and the fourth lens L4 is moved toward the object side.

The erect optical system 2 is formed by two prisms including, in order from the object side, the triangular prism P1 and the roof prism P2. An air space is provided between the triangular prism P1 and the roof prism P2, and the focal position of the objective lens system 1 is located in the air space. All optical surfaces of the triangular prism P1 and the roof prism P2 are planar surfaces, and both the triangular prism P1 and the roof prism P2 are made of a glass material.

The eyepiece lens system 3 is formed by one lens having a biconvex shape in the paraxial region. The object-side surface of this lens is an aspherical surface.

The above-described basic configuration of Example 1 also applies to Examples 2 to 8.

Basic lens data from the first lens L1 to the eye point of the real-image variable-magnification viewfinder of Example 1 is shown in the upper table of Table 1, which will be presented later. In this table, each value in the column of "Si" represents the surface number of the i-th (i=1, 2, 3, . . . ) surface, where the object-side surface of the most object-side element is the 1st surface and the number is sequentially increased toward the eye point side. Each value in the column of "Ri" represents the radius of curvature of the i-th surface. Each value in the column of "Di" represents the surface interval between the i-th surface and the i+1-th surface along the optical axis Z. Each value in the column of "Ndj" represents the refractive index with respect to the d-line (the wavelength of 587.6 nm) of the j-th (j=1, 2, 3, . . . ) element, where the most object-side element is the 1st element and the number is sequentially increased toward the eye point side. Each value in the column of "vdj" represents the Abbe number with respect to the d-line of the j-th element. It should be noted that the sign with respect to the radius of curvature means that a surface shape that is convex toward the object side is positive and a surface shape that is convex toward the eye point side is negative.

The texts "DD[2]", "DD[4]", "DD[6]" and "DD[8]" in the column of Di of Table 1 are variable intervals that are changed during magnification change. Values of the variable intervals, the angular magnification and the total angle of view ("2ω (°)" in the table) at the lowest magnification, at an intermediate magnification ("Intermediate" in the table), and at the highest magnification are shown in the lower table of Table 1. The unit of the total angle of view is "degrees". The unit of the length here is "millimeters".

In the upper table of Table 1, each aspherical surface is indicated by the symbol "*" added to the surface number thereof. In the column of radius of curvature, a numerical value of the paraxial radius of curvature is shown as the radius of curvature of each aspherical surface. Aspherical coefficients of each aspherical surface are shown in Table 2, where "E-n" (where n is an integer) following each numerical value of the aspherical coefficient shown in Table 2 means "×10$^{-n}$". The aspherical coefficients are values of coefficients K and Am (where m=4, 6, 8, . . . ) in the aspherical surface equation below:

$$Zd = C \cdot h^2 / \{1 + (1 - KA \cdot C^2 \cdot h^2)^{1/2}\} + \Sigma Am \cdot h^m \quad (6),$$

where Zd is a depth of the aspherical surface (a length of a perpendicular line from a point with a height Y on the aspherical surface to a plane that is tangent to the apex of the aspherical surface and perpendicular to the optical axis), h is the height (a distance from the optical axis to the lens surface), C is a paraxial curvature, and KA and Am are aspherical coefficients (where m=4, 6, 8, . . . ). It should be noted that the numerical values shown in each table below are rounded at predetermined decimal places.

TABLE 1

Example 1

| Si | Ri | Di | Ndj | vdj |
|---|---|---|---|---|
| 1 | 35.0951 | 2.56 | 1.62299 | 58.16 |
| 2 | −35.0951 | DD[2] | | |
| *3 | −9.3486 | 1.00 | 1.58878 | 60.39 |
| 4 | 7.4646 | DD[4] | | |
| 5 | 9.7997 | 1.79 | 1.60300 | 65.44 |
| 6 | 21.6266 | DD[6] | | |
| *7 | 9.3762 | 3.70 | 1.53389 | 55.98 |
| *8 | −9.9701 | DD[8] | | |
| 9 | ∞ | 14.46 | 1.78472 | 25.68 |
| 10 | ∞ | 1.50 | | |
| 11 | ∞ | 24.58 | 1.78472 | 25.68 |
| 12 | ∞ | 1.40 | | |
| *13 | 52.7967 | 2.23 | 1.58878 | 60.39 |
| 14 | −12.0302 | 15.00 | | |
| Eye point | | | | |

| | Lowest magnification | Intermediate | Highest magnification |
|---|---|---|---|
| Angular magnification | 0.35 | 0.66 | 1.26 |
| 2ω(°) | 69.98 | 35.85 | 19.39 |
| DD[2] | 0.89 | 5.65 | 8.47 |
| DD[4] | 8.74 | 3.98 | 1.16 |
| DD[6] | 5.42 | 3.40 | 0.30 |
| DD[8] | 1.00 | 3.02 | 6.12 |

TABLE 2

Example 1

| | Surface number | | | |
|---|---|---|---|---|
| | 3 | 7 | 8 | 13 |
| KA | −7.5508E−01 | −7.0958E+00 | −1.6597E+00 | 9.4694E−01 |
| A4 | 8.8652E−04 | 1.8173E−04 | −2.0744E−04 | −8.5923E−05 |
| A6 | −8.9945E−05 | 3.0411E−05 | −1.8202E−05 | −6.2699E−06 |
| A8 | 1.4294E−05 | −6.8872E−06 | 3.0026E−06 | 6.5795E−07 |
| A10 | −1.0212E−06 | 4.3805E−07 | −2.9157E−07 | −3.1219E−08 |
| A12 | 2.5884E−08 | −1.3351E−08 | 1.1603E−08 | 5.0430E−10 |
| A14 | | 1.5567E−10 | −1.6803E−10 | |

TABLE 3

Example 2

| Si | Ri | Di | Ndj | vdj |
|---|---|---|---|---|
| 1 | 20.0490 | 2.00 | 1.62041 | 60.29 |
| 2 | −79.1930 | DD[2] | | |
| *3 | −8.4870 | 0.80 | 1.56793 | 58.39 |
| 4 | 7.2837 | DD[4] | | |
| 5 | 9.8200 | 2.00 | 1.75500 | 52.32 |
| 6 | 32.2983 | DD[6] | | |
| *7 | 8.7461 | 3.00 | 1.53389 | 55.98 |
| *8 | −20.4622 | DD[8] | | |
| 9 | ∞ | 14.42 | 1.62004 | 36.26 |
| 10 | ∞ | 1.20 | | |
| 11 | ∞ | 23.76 | 1.62004 | 36.26 |
| 12 | ∞ | 2.00 | | |
| *13 | 48.0000 | 2.35 | 1.56793 | 58.39 |
| 14 | −14.1935 | 15.00 | | |
| Eye point | | | | |

| | Lowest magnification | Intermediate | Highest magnification |
|---|---|---|---|
| Angular magnification | 0.32 | 0.62 | 1.11 |
| 2ω (°) | 66.58 | 34.22 | 19.15 |

TABLE 3-continued

Example 2

|  |  |  |  |
|---|---|---|---|
| DD[2] | 0.90 | 5.87 | 9.38 |
| DD[4] | 10.32 | 5.35 | 1.84 |
| DD[6] | 4.49 | 2.65 | 1.00 |
| DD[8] | 1.00 | 2.84 | 4.49 |

TABLE 4

Example 2

| | Surface number | | | |
|---|---|---|---|---|
| | 3 | 7 | 8 | 13 |
| KA | −8.8416E+00 | −2.3540E+01 | 7.1082E+00 | −5.2372E+01 |
| A4 | −8.7826E−04 | 2.7582E−03 | −8.3328E−05 | 2.8580E−04 |
| A6 | 1.7420E−04 | −1.9021E−04 | 1.1844E−04 | −4.6153E−05 |
| A8 | −1.0210E−05 | 6.4439E−06 | −1.3406E−05 | 3.4689E−06 |
| A10 | −4.9233E−07 | −4.3421E−08 | 6.7867E−07 | −1.2797E−07 |
| A12 | 5.1874E−08 | −1.2882E−09 | −1.1935E−08 | 1.8272E−09 |

TABLE 5

Example 3

| Si | Ri | Di | Ndj | vdj |
|---|---|---|---|---|
| 1 | 24.4114 | 1.87 | 1.62299 | 58.16 |
| 2 | −60.5771 | DD[2] | | |
| *3 | −8.9299 | 1.00 | 1.58313 | 59.42 |
| 4 | 7.3079 | DD[4] | | |
| 5 | 9.1105 | 2.04 | 1.60300 | 65.44 |
| 6 | 40.9382 | DD[6] | | |
| *7 | 11.5282 | 2.98 | 1.53389 | 55.98 |
| *8 | −10.2880 | DD[8] | | |
| 9 | ∞ | 13.87 | 1.84666 | 23.78 |
| 10 | ∞ | 1.50 | | |
| 11 | ∞ | 24.96 | 1.84666 | 23.78 |
| 12 | ∞ | 1.40 | | |
| *13 | 38.4196 | 2.42 | 1.58313 | 59.42 |
| 14 | −12.5760 | 15.00 | | |
| Eye point | | | | |

| | Lowest magnification | Intermediate | Highest magnification |
|---|---|---|---|
| Angular magnification | 0.37 | 0.68 | 1.25 |
| 2ω (°) | 67.19 | 35.08 | 19.24 |
| DD[2] | 0.95 | 5.55 | 8.69 |
| DD[4] | 8.94 | 4.34 | 1.20 |
| DD[6] | 4.81 | 2.85 | 0.27 |
| DD[8] | 1.00 | 2.96 | 5.54 |

TABLE 6

Example 3

| | Surface number | | | |
|---|---|---|---|---|
| | 3 | 7 | 8 | 13 |
| KA | −5.8379E−01 | −9.7921E+00 | −1.0000E+01 | 3.3264E+00 |
| A4 | −1.8720E−04 | 1.3363E−03 | 4.2700E−05 | 1.0107E−04 |
| A6 | 2.7355E−04 | −1.6008E−04 | −1.0785E−04 | −2.8136E−05 |
| A8 | −3.5289E−05 | 4.0250E−06 | 6.5752E−06 | 2.0960E−06 |
| A10 | 1.9020E−06 | 4.8511E−07 | −1.2912E−08 | −7.9383E−08 |
| A12 | −3.2734E−08 | −3.6577E−08 | −1.0649E−08 | 1.1706E−09 |
| A14 | | 6.7913E−10 | 2.2832E−10 | |

TABLE 7

Example 4

| Si | Ri | Di | Ndj | vdj |
|---|---|---|---|---|
| 1 | 35.1507 | 2.45 | 1.62299 | 58.16 |
| 2 | −35.1507 | DD[2] | | |
| *3 | −9.5315 | 1.00 | 1.58313 | 59.46 |
| 4 | 7.2638 | DD[4] | | |
| 5 | 8.4114 | 2.00 | 1.60300 | 65.44 |
| 6 | 27.1399 | DD[6] | | |
| *7 | 10.0790 | 2.98 | 1.53389 | 55.98 |
| *8 | −10.9951 | DD[8] | | |
| 9 | ∞ | 13.72 | 1.84666 | 23.78 |
| 10 | ∞ | 1.50 | | |
| 11 | ∞ | 24.74 | 1.84666 | 23.78 |
| 12 | ∞ | 1.40 | | |
| *13 | 28.8915 | 2.37 | 1.58313 | 59.46 |
| 14 | −13.9242 | 15.00 | | |
| Eye point | | | | |

| | Lowest magnification | Intermediate | Highest magnification |
|---|---|---|---|
| Angular magnification | 0.37 | 0.68 | 1.23 |
| 2ω (°) | 66.59 | 35.59 | 20.21 |
| DD[2] | 0.82 | 5.44 | 8.55 |
| DD[4] | 8.75 | 4.13 | 1.03 |
| DD[6] | 4.81 | 2.89 | 0.32 |
| DD[8] | 1.00 | 2.92 | 5.49 |

TABLE 8

Example 4

| | Surface number | | | |
|---|---|---|---|---|
| | 3 | 7 | 8 | 13 |
| KA | −1.6109E+00 | −6.5117E+00 | −9.8830E+00 | 6.2004E+00 |
| A4 | −2.0888E−04 | 1.3386E−03 | 4.4099E−04 | −2.5320E−05 |
| A6 | 2.1400E−04 | −1.6945E−04 | −1.6336E−04 | −1.3101E−05 |
| A8 | −2.6768E−05 | 3.2208E−06 | 9.7388E−06 | 7.8083E−07 |
| A10 | 1.4021E−06 | 7.3018E−07 | −9.0631E−10 | −2.2073E−08 |
| A12 | −2.2786E−08 | −5.2087E−08 | −1.7393E−08 | 2.1814E−10 |
| A14 | | 9.7446E−10 | 3.7934E−10 | |

TABLE 9

Example 5

| Si | Ri | Di | Ndj | vdj |
|---|---|---|---|---|
| 1 | 35.0951 | 2.56 | 1.62299 | 58.16 |
| 2 | −35.0951 | DD[2] | | |
| *3 | −9.3486 | 1.00 | 1.58878 | 60.39 |
| 4 | 7.4646 | DD[4] | | |
| 5 | 9.7997 | 1.79 | 1.60300 | 65.44 |
| 6 | 21.6266 | DD[6] | | |
| *7 | 9.3762 | 3.70 | 1.53389 | 55.98 |
| *8 | −9.9701 | DD[8] | | |
| 9 | ∞ | 14.46 | 1.78590 | 44.20 |
| 10 | ∞ | 1.50 | | |
| 11 | ∞ | 24.58 | 1.78590 | 44.20 |
| 12 | ∞ | 1.40 | | |
| *13 | 52.7967 | 2.23 | 1.58878 | 60.39 |
| 14 | −12.0302 | 15.00 | | |
| Eye point | | | | |

| | Lowest magnification | Intermediate | Highest magnification |
|---|---|---|---|
| Angular magnification | 0.35 | 0.66 | 1.26 |
| 2ω (°) | 69.91 | 35.82 | 19.37 |

TABLE 9-continued

Example 5

|        |      |      |      |
|--------|------|------|------|
| DD[2]  | 0.89 | 5.65 | 8.47 |
| DD[4]  | 8.74 | 3.98 | 1.16 |
| DD[6]  | 5.42 | 3.40 | 0.30 |
| DD[8]  | 1.00 | 3.02 | 6.12 |

TABLE 10

Example 5

Surface number

|    | 3           | 7           | 8           | 13          |
|----|-------------|-------------|-------------|-------------|
| KA | −7.5508E−01 | −7.0958E+00 | −1.6597E+00 | 9.4694E−01  |
| A4 | 8.8652E−04  | 1.8173E−04  | −2.0744E−04 | −8.5923E−05 |
| A6 | −8.9945E−05 | 3.0411E−05  | −1.8202E−05 | −6.2699E−06 |
| A8 | 1.4294E−05  | −6.8872E−06 | 3.0026E−06  | 6.5795E−07  |
| A10 | −1.0212E−06 | 4.3805E−07 | −2.9157E−07 | −3.1219E−08 |
| A12 | 2.5884E−08  | −1.3351E−08 | 1.1603E−08  | 5.0430E−10  |
| A14 |             | 1.5567E−10  | −1.6803E−10 |             |

TABLE 11

Example 6

| Si | Ri | Di | Ndj | vdj |
|----|------|------|------|------|
| 1  | 20.0490 | 2.00 | 1.62041 | 60.29 |
| 2  | −79.1930 | DD[2] | | |
| *3 | −8.4870 | 0.80 | 1.56793 | 58.39 |
| 4  | 7.2837 | DD[4] | | |
| 5  | 9.8200 | 2.00 | 1.75500 | 52.32 |
| 6  | 32.2983 | DD[6] | | |
| *7 | 8.7461 | 3.00 | 1.53389 | 55.98 |
| *8 | −20.4622 | DD[8] | | |
| 9  | ∞ | 14.42 | 1.62041 | 60.29 |
| 10 | ∞ | 1.20 | | |
| 11 | ∞ | 23.76 | 1.62041 | 60.29 |
| 12 | ∞ | 2.00 | | |
| *13 | 48.0000 | 2.35 | 1.56793 | 58.39 |
| 14 | −14.1935 | 15.00 | | |
| Eye point | | | | |

|  | Lowest magnification | Intermediate | Highest magnification |
|---|---|---|---|
| Angular magnification | 0.32 | 0.62 | 1.11 |
| 2ω (°) | 66.56 | 34.20 | 19.14 |
| DD[2] | 0.90 | 5.87 | 9.38 |
| DD[4] | 10.32 | 5.35 | 1.84 |
| DD[6] | 4.49 | 2.65 | 1.00 |
| DD[8] | 1.00 | 2.84 | 4.49 |

TABLE 12

Example 6

Surface number

|    | 3           | 7           | 8           | 13          |
|----|-------------|-------------|-------------|-------------|
| KA | −8.8416E+00 | −2.3540E+01 | 7.1082E+00  | −5.2372E+01 |
| A4 | −8.7826E−04 | 2.7582E−03  | −8.3328E−05 | 2.8580E−04  |
| A6 | 1.7420E−04  | −1.9021E−04 | 1.1844E−04  | −4.6153E−05 |
| A8 | −1.0210E−05 | 6.4439E−06  | −1.3406E−05 | 3.4689E−06  |
| A10 | −4.9233E−07 | −4.3421E−08 | 6.7867E−07 | −1.2797E−07 |
| A12 | 5.1874E−08  | −1.2882E−09 | −1.1935E−08 | 1.8272E−09  |

TABLE 13

Example 7

| Si | Ri | Di | Ndj | vdj |
|----|------|------|------|------|
| 1  | 24.4114 | 1.87 | 1.62299 | 58.16 |
| 2  | −60.5771 | DD[2] | | |
| *3 | −8.9299 | 1.00 | 1.58313 | 59.42 |
| 4  | 7.3079 | DD[4] | | |
| 5  | 9.1105 | 2.04 | 1.60300 | 65.44 |
| 6  | 40.9382 | DD[6] | | |
| *7 | 11.5282 | 2.98 | 1.53389 | 55.98 |
| *8 | −10.2880 | DD[8] | | |
| 9  | ∞ | 13.87 | 1.83400 | 37.16 |
| 10 | ∞ | 1.50 | | |
| 11 | ∞ | 24.96 | 1.83400 | 37.16 |
| 12 | ∞ | 1.40 | | |
| *13 | 38.4196 | 2.42 | 1.58313 | 59.42 |
| 14 | −12.5760 | 15.00 | | |
| Eye point | | | | |

|  | Lowest magnification | Intermediate | Highest magnification |
|---|---|---|---|
| Angular magnification | 0.37 | 0.67 | 1.23 |
| 2ω (°) | 67.92 | 35.42 | 19.45 |
| DD[2] | 0.95 | 5.55 | 8.69 |
| DD[4] | 8.94 | 4.34 | 1.20 |
| DD[6] | 4.81 | 2.85 | 0.27 |
| DD[8] | 1.00 | 2.96 | 5.54 |

TABLE 14

Example 7

Surface number

|    | 3           | 7           | 8           | 13          |
|----|-------------|-------------|-------------|-------------|
| KA | −5.8379E−01 | −9.7921E+00 | −1.0000E+01 | 3.3264E+00  |
| A4 | −1.8720E−04 | 1.3363E−03  | 4.2700E−05  | 1.0107E−04  |
| A6 | 2.7355E−04  | −1.6008E−04 | −1.0785E−04 | −2.8136E−05 |
| A8 | −3.5289E−05 | 4.0250E−06  | 6.5752E−06  | 2.0960E−06  |
| A10 | 1.9020E−06 | 4.8511E−07  | −1.2912E−08 | −7.9383E−08 |
| A12 | −3.2734E−08 | −3.6577E−08 | −1.0649E−08 | 1.1706E−09  |
| A14 |             | 6.7913E−10  | 2.2832E−10  |             |

TABLE 15

Example 8

| Si | Ri | Di | Ndj | vdj |
|----|------|------|------|------|
| 1  | 35.1507 | 2.45 | 1.62299 | 58.16 |
| 2  | −35.1507 | DD[2] | | |
| *3 | −9.5315 | 1.00 | 1.58313 | 59.46 |
| 4  | 7.2638 | DD[4] | | |
| 5  | 8.4114 | 2.00 | 1.60300 | 6544 |
| 6  | 27.1399 | DD[6] | | |
| *7 | 10.0790 | 2.98 | 1.53389 | 55.98 |
| *8 | −10.9951 | DD[8] | | |
| 9  | ∞ | 13.72 | 1.83400 | 37.16 |
| 10 | ∞ | 1.50 | | |
| 11 | ∞ | 24.74 | 1.83400 | 37.16 |
| 12 | ∞ | 1.40 | | |
| *13 | 28.8915 | 2.37 | 1.58313 | 59.46 |
| 14 | −13.9242 | 15.00 | | |
| Eye point | | | | |

|  | Lowest magnification | Intermediate | Highest magnification |
|---|---|---|---|
| Angular magnification | 0.37 | 0.67 | 1.21 |
| 2ω (°) | 67.27 | 35.94 | 20.45 |

TABLE 15-continued

Example 8

| | | | |
|---|---|---|---|
| DD[2] | 0.82 | 5.44 | 8.55 |
| DD[4] | 8.75 | 4.13 | 1.03 |
| DD[6] | 4.81 | 2.89 | 0.32 |
| DD[8] | 1.00 | 2.92 | 5.49 |

TABLE 16

Example 8

Surface number

| | 3 | 7 | 8 | 13 |
|---|---|---|---|---|
| KA | −1.6109E+00 | −6.5117E+00 | −9.8830E+00 | 6.2004E+00 |
| A4 | −2.0888E−04 | 1.3386E−03 | 4.4099E−04 | −2.5320E−05 |
| A6 | 2.1400E−04 | −1.6945E−04 | −1.6336E−04 | −1.3101E−05 |
| A8 | −2.6768E−05 | 3.2208E−06 | 9.7388E−06 | 7.8083E−07 |
| A10 | 1.4021E−06 | 7.3018E−07 | −9.0631E−10 | −2.2073E−08 |
| A12 | −2.2786E−08 | −5.2087E−08 | −1.7393E−08 | 2.1814E−10 |
| A14 | | 9.7446E−10 | 3.7934E−10 | |

Table 17 shows values corresponding to the conditional expressions (1) to (4) of the real-image variable-magnification viewfinders of Examples 1 to 8. The values shown in Table 17 are with respect to the d-line.

TABLE 17

Conditional expression

| | (1) Nd | (2) $|\gamma \cdot \tan\omega|$ | (3) vd | (4) (R1f + R1r)/(R1f − R1r) |
|---|---|---|---|---|
| Example 1 | 1.78472 | 0.24 | 25.68 | 0.00 |
| Example 2 | 1.62004 | 0.21 | 36.26 | −0.60 |
| Example 3 | 1.84666 | 0.25 | 23.78 | −0.43 |
| Example 4 | 1.84666 | 0.24 | 23.78 | 0.00 |
| Example 5 | 1.78590 | 0.24 | 44.20 | 0.00 |
| Example 6 | 1.62041 | 0.21 | 60.29 | −0.60 |
| Example 7 | 1.83400 | 0.25 | 37.16 | −0.43 |
| Example 8 | 1.83400 | 0.25 | 37.16 | 0.00 |

Figure 10:
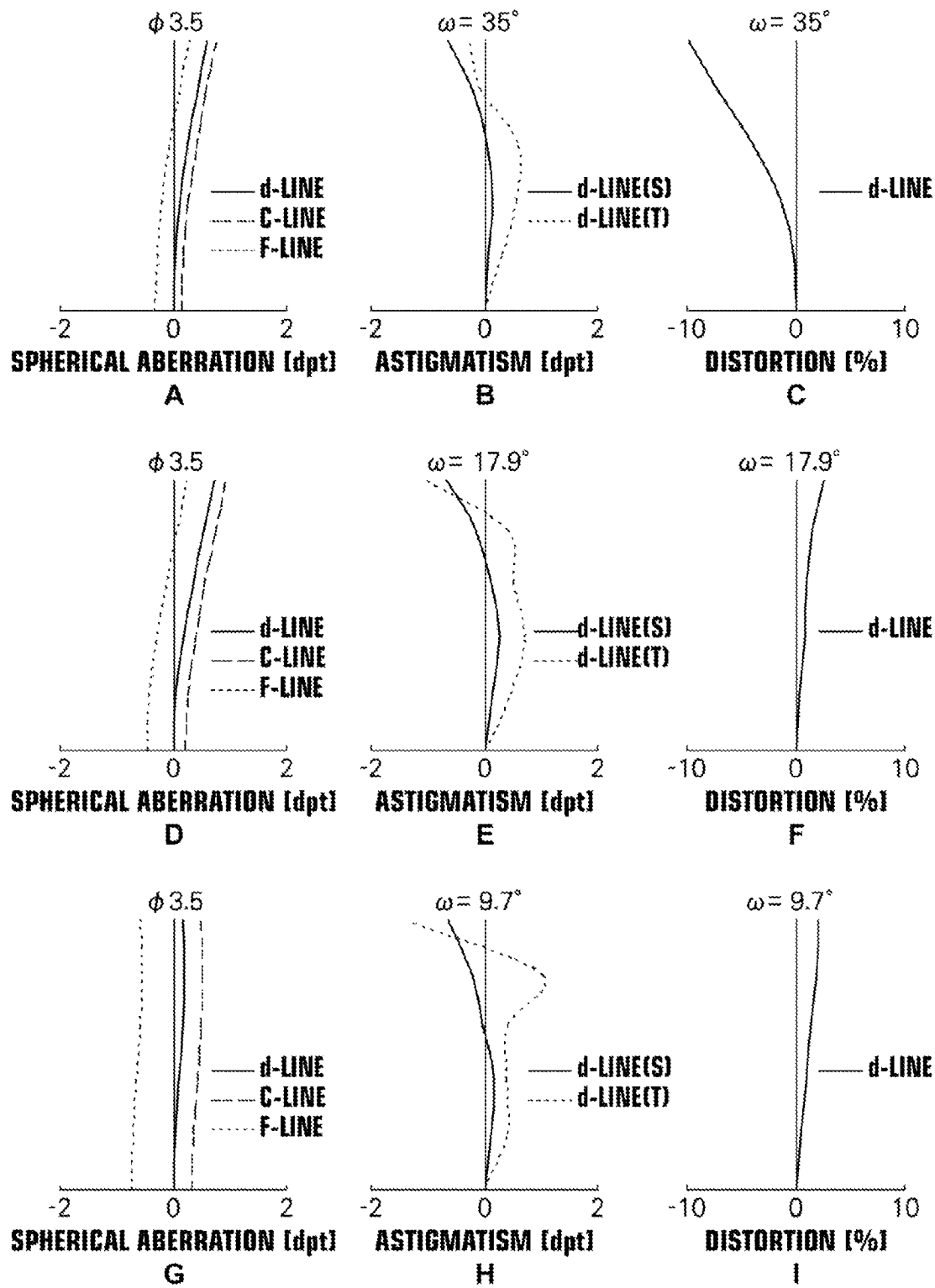
FIG. 10 shows, at A to I, aberration diagrams of the real-image variable-magnification viewfinder of Example 1 of the invention.

FIG. 10 shows, at A, B and C, spherical aberration, astigmatism and distortion of the real-image variable-magnification viewfinder of Example 1 in the lowest magnification state, respectively. Also, FIG. 10 shows, at D, E and F, spherical aberration, astigmatism and distortion of the real-image variable-magnification viewfinder of Example 1 in the intermediate magnification state, respectively. Also, FIG. 10 shows, at G, H and I, spherical aberration, astigmatism and distortion of the real-image variable-magnification viewfinder of Example 1 in the highest magnification state, respectively.

Each aberration diagram is with respect to the d-line. However, in each spherical aberration diagram, aberrations with respect to the F-line (the wavelength of 486.1 nm) and the C-line (the wavelength of 656.3 nm) are also shown. In each astigmatism diagram, an aberration in the sagittal direction is shown in the solid line and an aberration in the tangential direction is shown in the dashed line. The description "φ3.5" above the vertical axis of each spherical aberration diagram means a diameter at the eye point, and the symbol "ω" in the other aberration diagrams means the half angle of view. The unit of the horizontal axis of each spherical aberration diagram and each astigmatism diagram is "diopter".

Figure 11:
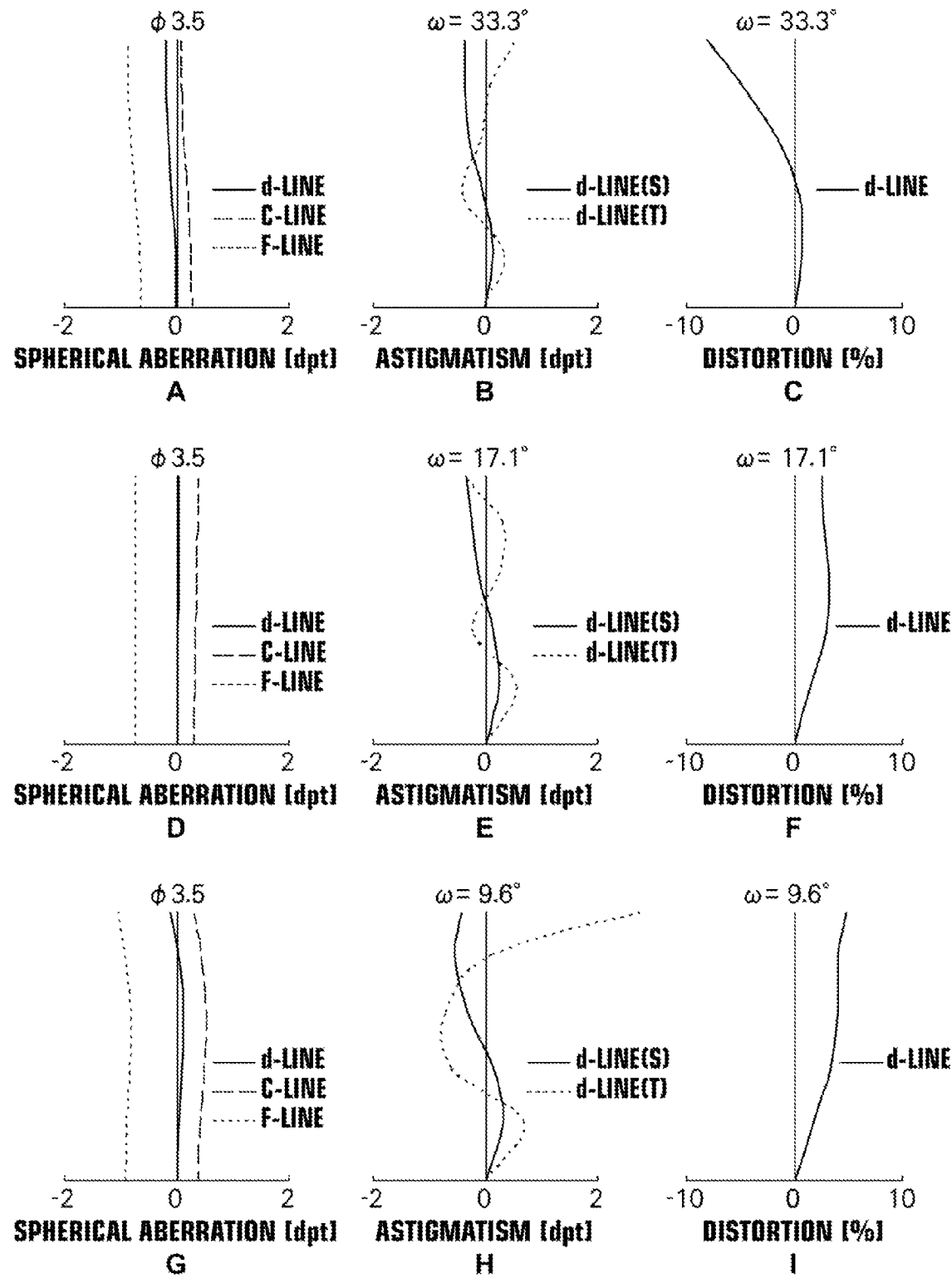
FIG. 11 shows, at A to I, aberration diagrams of the real-image variable-magnification viewfinder of Example 2 of the invention.
Figure 12:
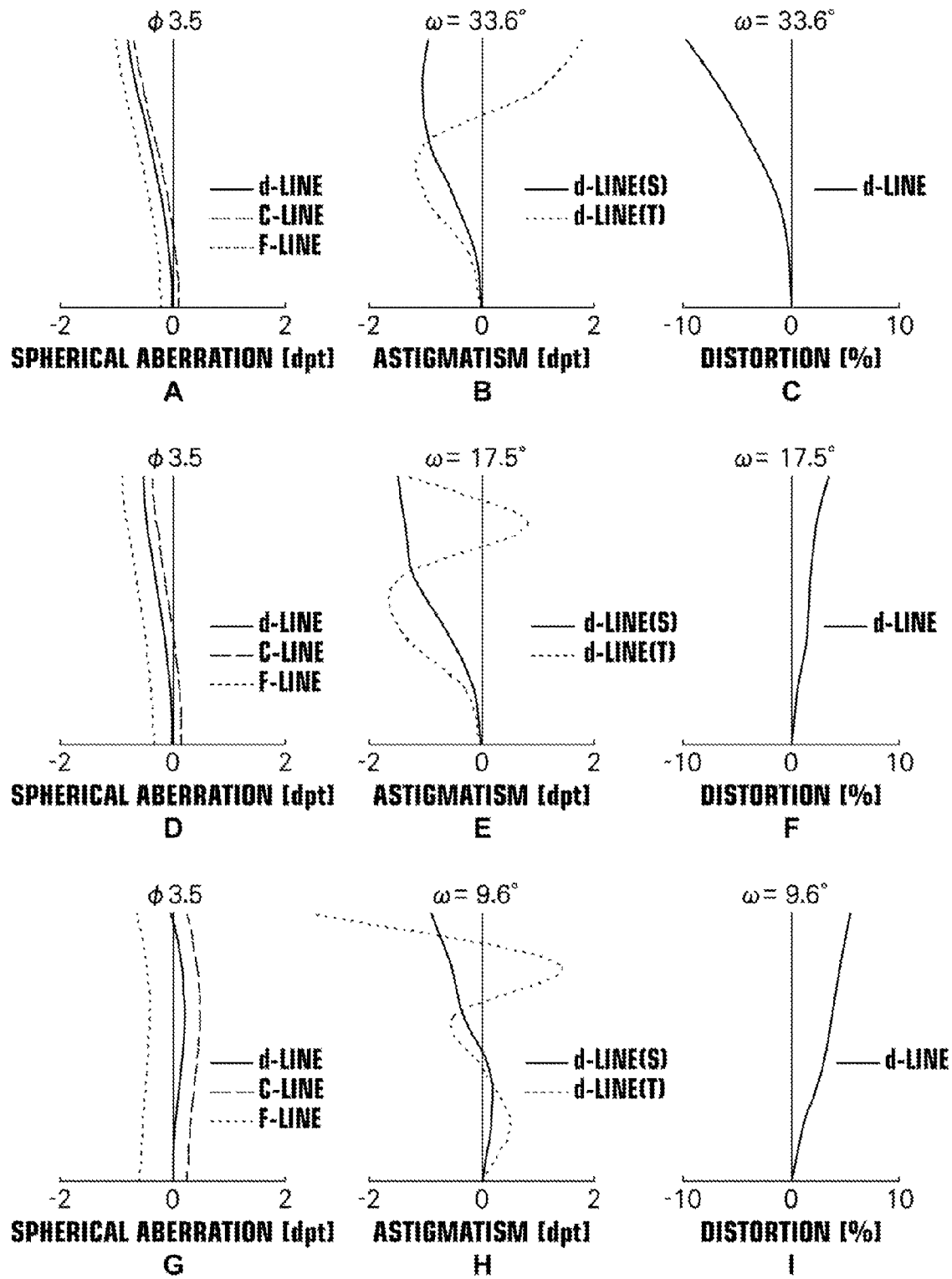
FIG. 12 shows, at A to I, aberration diagrams of the real-image variable-magnification viewfinder of Example 3 of the invention.
Figure 13:
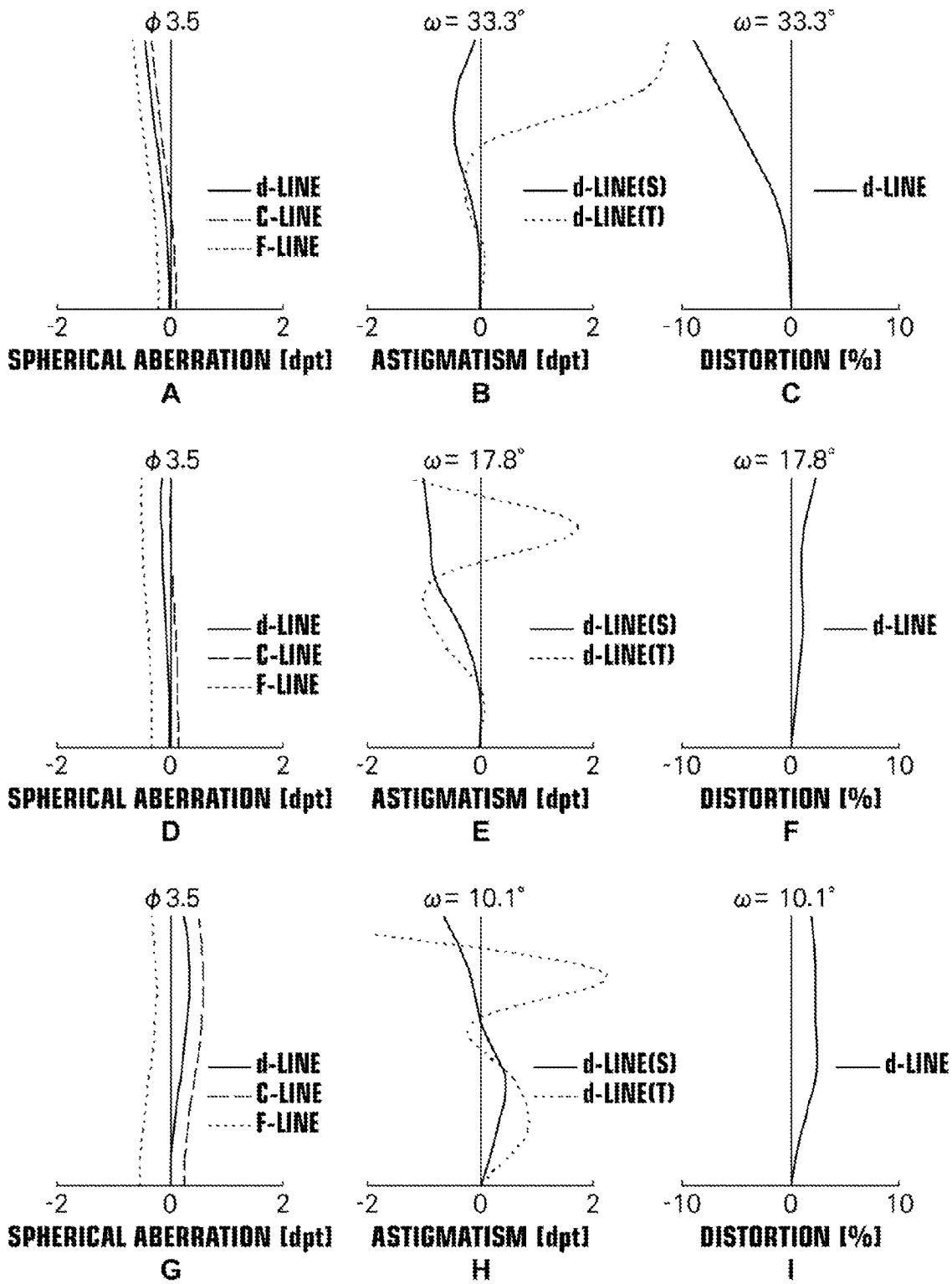
FIG. 13 shows, at A to I, aberration diagrams of the real-image variable-magnification viewfinder of Example 4 of the invention.
Figure 14:
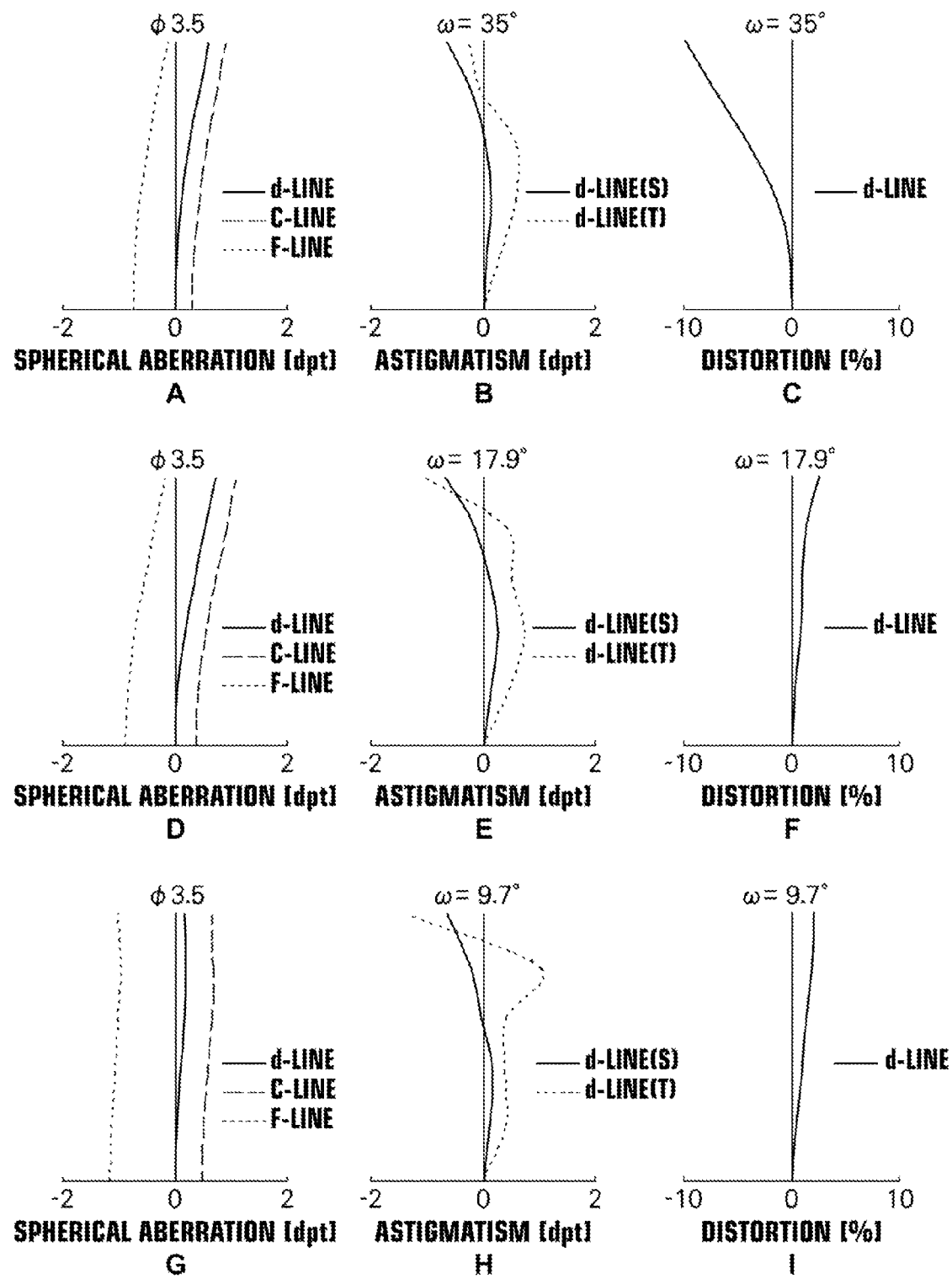
FIG. 14 shows, at A to I, aberration diagrams of the real-image variable-magnification viewfinder of Example 5 of the invention.
Figure 15:
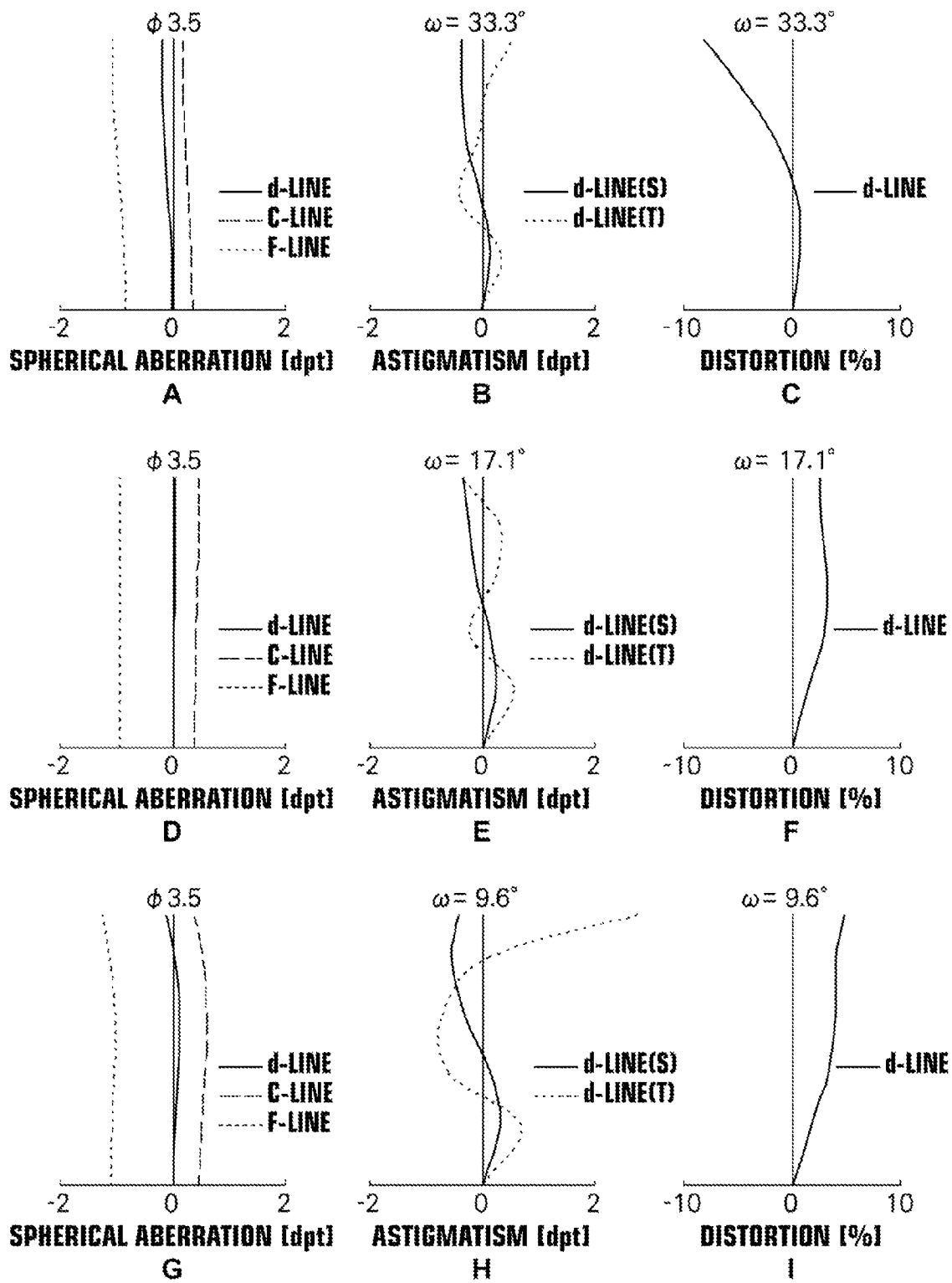
FIG. 15 shows, at A to I, aberration diagrams of the real-image variable-magnification viewfinder of Example 6 of the invention.
Figure 16:
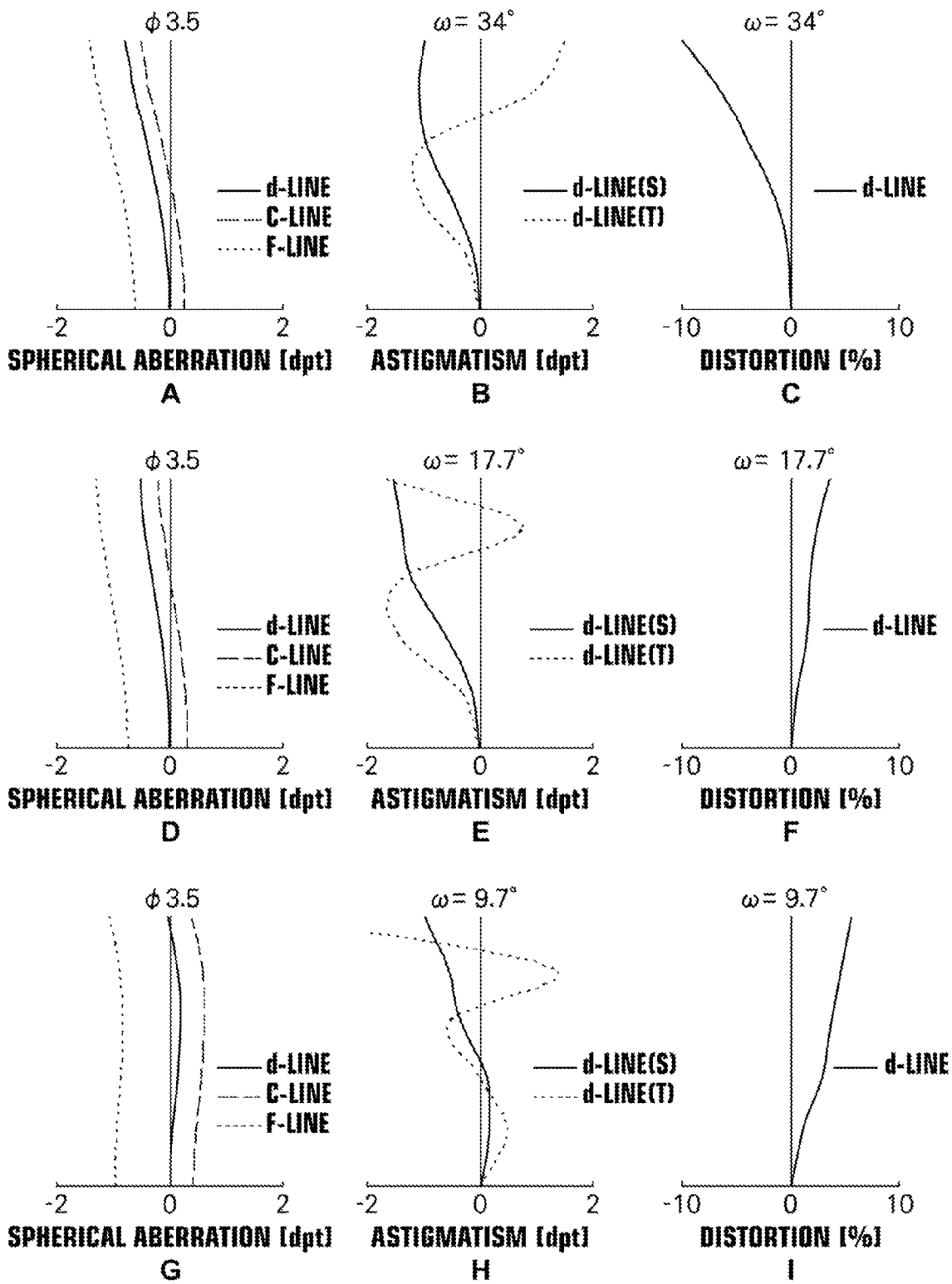
FIG. 16 shows, at A to I, aberration diagrams of the real-image variable-magnification viewfinder of Example 7 of the invention.
Figure 17:
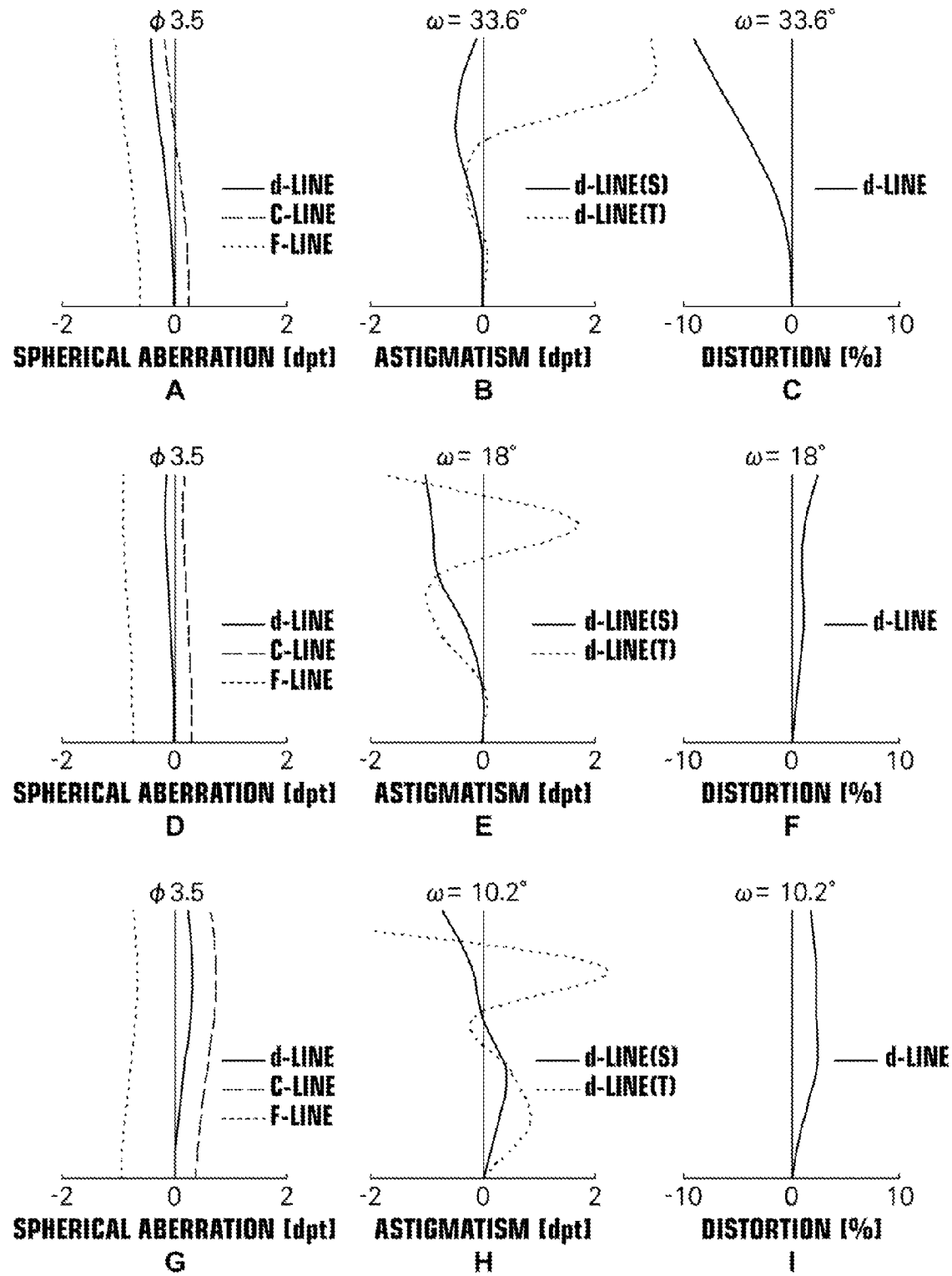
FIG. 17 shows, at A to I, aberration diagrams of the real-image variable-magnification viewfinder of Example 8 of the invention.

Similarly, aberration diagrams of the real-image variable-magnification viewfinder of Example 2 in the lowest magnification state, in the intermediate magnification state and in the highest magnification state are shown at A to I in FIG. 11; aberration diagrams of the real-image variable-magnification viewfinder of Example 3 in the lowest magnification state, in the intermediate magnification state and in the highest magnification state are shown at A to I in FIG. 12; aberration diagrams of the real-image variable-magnification viewfinder of Example 4 in the lowest magnification state, in the intermediate magnification state and in the highest magnification state are shown at A to I in FIG. 13; aberration diagrams of the real-image variable-magnification viewfinder of Example 5 in the lowest magnification state, in the intermediate magnification state and in the highest magnification state are shown at A to I in FIG. 14; aberration diagrams of the real-image variable-magnification viewfinder of Example 6 in the lowest magnification state, in the intermediate magnification state and in the highest magnification state are shown at A to I in FIG. 15; aberration diagrams of the real-image variable-magnification viewfinder of Example 7 in the lowest magnification state, in the intermediate magnification state and in the highest magnification state are shown at A to I in FIG. 16; and aberration diagrams of the real-image variable-magnification viewfinder of Example 8 in the lowest magnification state, in the intermediate magnification state and in the highest magnification state are shown at A to I in FIG. 17.

The present invention has been described with reference to the embodiments and examples. However, the invention is not limited to the above-described embodiments and examples, and various modifications may be made to the invention. For example, the values of the radius of curvature, the surface interval, the refractive index, the Abbe number, the aspherical coefficients, etc., of each lens component are not limited to the values shown in the above-described numerical examples and may take different values.

What is claimed is:

1. A real-image variable-magnification viewfinder substantially consisting of: an objective lens system; an erect optical system formed by a plurality of optical members; and an eyepiece lens system having a positive refractive power,
    wherein the objective lens system substantially consists of four lenses including, in order from an object side, a first lens having a positive refractive power, a second lens having a negative refractive power, a third lens having a positive refractive power, a fourth lens having a positive refractive power,
    the first lens and the third lens are fixed relative to an optical axis direction during magnification change, and the second lens and the fourth lens are moved in the optical axis direction during magnification change,
    all optical surfaces of all the optical members forming the erect optical system are planar surfaces,
    at least one of the optical members forming the erect optical system is made of a glass material, and
    conditional expressions (1) and (2A) below are satisfied:

$$1.60 < Nd \quad (1)$$

and $$0.23 < |\gamma \cdot \tan\omega| < 0.35 \quad (2A),$$

where Nd is a refractive index with respect to the d-line of the glass material, γ is an angular magnification of the entire system in a lowest magnification state and ω is a maximum half angle of view in the lowest magnification state.

2. The real-image variable-magnification viewfinder as claimed in claim 1, wherein at least one of the optical members forming the erect optical system is made of a glass material, and conditional expression (3) below is satisfied:

$$\nu d < 30 \quad (3),$$

where νd is an Abbe number with respect to the d-line of the glass material.

3. The real-image variable-magnification viewfinder as claimed in claim 1, wherein, when the magnification is changed from a low magnification side to a high magnification side, the second lens is moved toward an eyepiece lens system and the fourth lens is moved toward the object side.

4. The real-image variable-magnification viewfinder as claimed in claim 1, wherein conditional expression (4) below is satisfied:

$$-1 < (R1f + R1r)/(R1f - R1r) < 1 \quad (4),$$

where R1f is a radius of curvature of an object-side surface of the first lens, and R1r is a radius of curvature of an eye point-side surface of the first lens.

5. The real-image variable-magnification viewfinder as claimed in claim 1, wherein conditional expression (1A) below is satisfied:

$$1.7 < Nd \quad (1A).$$

6. The real-image variable-magnification viewfinder as claimed in claim 5, wherein conditional expression (1B) below is satisfied:

$$1.8 < Nd \quad (1B).$$

7. The real-image variable-magnification viewfinder as claimed in claim 4, wherein conditional expression (4A) below is satisfied:

$$-0.80 < (R1f + R1r)/(R1f - R1r) < 0.10 \quad (4A).$$

8. An imaging apparatus comprising the real-image variable-magnification viewfinder as claimed in claim 1.

* * * * *